United States Patent
Takehara et al.

[11] Patent Number: 5,823,515
[45] Date of Patent: Oct. 20, 1998

[54] FLUID CONTAINED ENGINE MOUNTING DEVICE AND METHOD OF MANUFACTURING THE SAME

[75] Inventors: Shin Takehara; Haruyuki Taniguchi; Takahiko Tanaka, all of Higashihiroshima; Hiroshi Hashino, Hiroshima; Yoichi Komoto, Okayama; Katsutoshi Ota, Okayama; Morihisa Hanafusa, Okayama, all of Japan

[73] Assignees: Mazda Motor Corporation, Hiroshima-ken; Kurashiki Kako Co., Ltd., Okayama, both of Japan

[21] Appl. No.: 519,309

[22] Filed: Aug. 25, 1995

[30] Foreign Application Priority Data

Aug. 25, 1994 [JP] Japan .................................. 6-200788

[51] Int. Cl.$^6$ ........................................................ F16F 5/00
[52] U.S. Cl. .................... 267/140.13; 267/64.11; 248/636
[58] Field of Search .................... 267/140.13, 140.14, 267/219, 220, 64.11, 64.27; 180/300, 312; 248/562, 636

[56] References Cited

U.S. PATENT DOCUMENTS

| | | | |
|---|---|---|---|
| 2,524,405 | 10/1950 | Storrs | 267/140.13 |
| 2,582,363 | 1/1952 | Thiry | 267/140.13 X |
| 3,888,450 | 6/1975 | Seilenbinder | 267/140.13 |
| 4,712,777 | 12/1987 | Miller . | |
| 5,540,549 | 7/1996 | McGuire | 267/140.13 X |

FOREIGN PATENT DOCUMENTS

| | | |
|---|---|---|
| 0258851 | 3/1988 | European Pat. Off. . |
| 0370524 | 5/1990 | European Pat. Off. . |
| 0380760 | 8/1990 | European Pat. Off. . |
| 2631090 | 11/1989 | France . |
| 60-139507 | 11/1985 | Japan . |
| 60-237237 | 4/1986 | Japan . |
| 61-084431 | 9/1986 | Japan . |

*Primary Examiner*—Lee W. Young
*Attorney, Agent, or Firm*—Sixbey, Friedman, Leedom & Ferguson, PC; Gerald J. Ferguson, Jr.; Donald R. Studebaker

[57] ABSTRACT

A fluid-contained engine mounting device, containing a fluid in a fluid container closed up air-tightly by an elastic top wall and an elastic bottom diaphragm which is divided by a partition wall into a first fluid chamber closed by the elastic top wall and a second fluid chamber closed by the elastic bottom diaphragm and confining a predetermined quantity of a gas in the first fluid chamber, absorbs vibrations of the engine transmitted thereto through expansion and contraction of the elastic top wall and elastic bottom diaphragm.

14 Claims, 22 Drawing Sheets

| PARAMETER | AIR SPRING | MO |
|---|---|---|
| SUPPORT (KM) | 17.60 | 17.60 |
| SUPPORT (CM) | 0.00 | 0.00 |
| EXPANSIVE (KA) | 40.00 | 15.00 |
| DIA.(FKA) | 0.50 | 0.50 |
| DIA (FCB) | 0.00 | 0.00 |
| AREA (A) | 1200.00 | 1200.00 |
| AREA (a) | 20.00 | 20.00 |
| LENGTH (l) | 130.00 | 130.00 |
| ATTEN. (CE) | 0.07 | 0.07 |
| AREA (b) | 500.00 | 0.00 |
| LENGTH (L) | 20.00 | 0.00 |
| AIR (cc) | 1.00 | 0.00 |
| ATTEN. (CD) | 0.00 | 0.00 |
| OL RESONANCE | 19.40 | 20.26 |
| OL MASS | 9.36 | 9.36 |
| DV RESONANCE | 511.99 | 0.00 |
| DV MASS | 0.06 | 0.00 |
| DV SPRING | 2083 | % |

Fig. 14

NOISE REDUCTION
EVALUATION TEST RESULT

| QUANTITY (cc) | POINT |
|---|---|
| 0.1 | 2.0 |
| 0.2 | 3.0 |
| 0.3 | 3.5 |
| 0.4 | 4.0 |
| 0.5 | 5.0 |
| 1.0 | 5.5 |
| 1.5 | 6.0 |
| 2.0 | 6.5 |
| 3.0 | 7.0 |
| 3.5 | 7.0 |
| 5.0 | 7.5 |
| 6.0 | 7.5 |
| 7.0 | 8.0 |
| 7.5 | 8.0 |
| 10.0 | 8.0 |

Fig. 15

VIBRATION REDUCTION
EVALUATION TEST RESULT

| QUANTITY (cc) | POINT | Tan δ |
|---|---|---|
| 0.1 | 8.5 | |
| 0.3 | 8.5 | |
| 0.5 | 8.5 | |
| 1.0 | 8.0 | |
| 1.5 | 7.5 | |
| 2.0 | 7.5 | |
| 2.5 | 7.0 | |
| 3.0 | 7.0 | Tan δ = 0.6 |
| 3.5 | 6.5 | |
| 4.0 | 6.0 | |
| 5.0 | 5.5 | |
| 7.0 | 5.0 | Tan δ = 0.3 |
| 8.0 | 4.5 | |
| 10.0 | 4.0 | |

NOISE REDUCTION
EVALUATION TEST RESULT

| VIBRATION TRANSMISSION EFFICIENCY DROP (%) | POINT |
|---|---|
| 10 | 4.0 |
| 20 | 4.5 |
| 30 | 5.5 |
| 50 | 6.0 |
| 60 | 6.0 |
| 75 | 7.0 |
| 95 | 7.0 |

| POINT | EVALUATION |
|---|---|
| 10 | EXCELLENT |
| 9 | REMARKABLY GOOD |
| 8 | VERY GOOD |
| 7 | GOOD |
| 6 | NO PROBLRM |
| 5 | ALLOWABLE LIMIT |
| 4 | NEARLY REJECTED |
| 3 | REJECTED |
| 2 | VERY BAD |
| 1 | WORST | ced
FLUID CONTAINED ENGINE MOUNTING DEVICE AND METHOD OF MANUFACTURING THE SAME

BACKGROUND OF THE INVENTION

1. Field of the Invention

The present invention relates to a fluid contained engine mounting device and a method of manufacturing the same.

2. Description of Related Art

Typically, engine mounting devices for mounting an automobile engine on vehicle must perform fundamental functions, such as a supporting function, a vibration absorption and damping function and an engine shake preventive function. Specifically, the supporting function refers to the effect that an engine mounting device supports statically/dynamically an engine mounted on the vehicle so as to prevent mechanical interference of the engine with the vehicle body, the vibration absorption and damping function refers to the effect that the engine mounting device attenuates and absorbs vibrations and noises of the engine to prevent transmission of engine vibrations to the vehicle body as much as possible, and the engine shake preventive function refers to the effect that the engine mounting device prevents the engine from shaking so that the vehicle rides smoothly over bumps in a road. Because there are somewhat conflicting requirements that govern the fundamental functions, it is often very hard for engine mounting devices of this type to perform satisfactorily these fundamental functions all at once. That is, typically, the ideal of such an engine mounting device is required to have excellent vibration transmitting and vibration damping characteristics with regard to the supporting function, lesser vibration transmitting characteristics with regard to the vibration absorption and damping function, and excellent vibration damping characteristics with regard to the shake preventive function. A rubber type of prior art engine mounting devices are designed and adapted so as to have these dynamic characteristics within the limits of compromise.

In recent years, fluid-contained vibration damper apparatuses are widely used as engine mounting devices in place of the rubber type of engine mounting devices. These fluid-contained engine mounting devices are categorized into three types or first to third generations specified as below.

First Generation Fluid-Contained Engine Mounting Device

The first generation of fluid-contained engine mounting devices were developed so as to perform the fundamental functions balanced at a high level as compared with the prior art rubber type of engine mounting devices. As shown in FIG. 27, a fluid container A1 is divided into two, namely primary and secondary, fluid chambers A2 and A3 by a stiff partition A4 with an opening or orifice A5 formed therein. The bottom of the fluid container A1 is formed by a diaphragm member A9. Vibrations, which are transmitted to an elastic top cover or wall A6 from an engine (not shown) through a top member A7 fitted to the engine, or otherwise from a rigid bottom member A8 fitted to a vehicle body (not shown), compels the contained fluid to move between the primary and secondary fluid chambers A2 and A3 through the orifice A5. By means of resonant vibrations of the fluid in the orifice A5, the first generation fluid-contained engine mounting device A enhances the damping characteristic for vibrations in a specific range of low frequencies and, however, diminishes the transmission characteristic for vibrations in a range of high frequencies.

Assuming that force F acting on the bottom member A8 causes deflection X of the elastic top wall A6, vibration transmission efficiency Kt and vibration attenuation efficiency Td are given by functions of vibration frequency F as follows:

$Kt=|F/X|$ $Td=Im(F/X)/Re(F/X)\sim \tan \delta$

The vibration transmission efficiency Kt and vibration attenuation efficiency Td are shown with regard to frequency F by graphs in FIGS. 28 and 29, respectively. In FIGS. 28 and 29, broken lines indicate the vibration transmission efficiency Kt and vibration attenuation efficiency Td of the prior art rubber type engine mounting device. As proven in FIGS. 28 and 29, the fluid-contained engine mounting device A yields considerable improvement in vibration transmission efficiency Kt and vibration attenuation efficiency Td as compared with the prior art rubber type engine mounting device.

However, for the fluid-contained engine mounting device A of the first generation, the elastic top wall A6 forming a part of the fluid chamber, such as a rubber wall, is required to have somewhat conflicting physical properties, such as rigidity sufficient to support an engine (which is hereafter referred to as supporting rigidity) and flexibility or stiffness sufficient to allow expansion of the fluid chamber (which is hereafter referred to as expansible stiffness). In order for the fluid-contained engine mounting device A to make the most of vibration attenuation characteristic, it is effective to locate the elastic top wall A6 in a position where it receives a large load. In such a case, the elastic top wall A6 must have high supporting rigidity and high expansible stiffness, and, consequently, the fluid chamber Al looses steadiness in shape. This provides enhancement in vibration transmission efficiency, which leads to adverse effects to vibrations and noises, and a rise in vibration frequency for the maximized vibration attenuation efficiency, which leads to aggravation of effective engine vibration control.

Second Generation Fluid-Contained Engine Mounting Device

The second generation of fluid-contained engine mounting devices were improved for the purpose of eliminating drawbacks involved in the first generation of fluid-contained engine mounting devices. As shown in FIG. 30, in order for the fluid-contained engine mounting device B to reduce the steadiness in shape of a primary fluid chamber B2 against expansion, a generally rigid partition B4 has an elastic part, such as made of an elastic rubber membrane B10, so as to be partly flexible. As apparent from FIG. 31, the second generation of fluid-contained engine mounting device B shows vibration transmission efficiency diminished for vibrations in a range of high frequencies as compared with that of the first generation, reducing the transmission of vibrations and noises to the vehicle body.

Third Generation Fluid-contained Engine Mounting Device

The third generation of fluid-contained engine mounting devices were improved as engine mounting apparatuses so as to diminish vibration transmission efficiency for vibrations in a specific range of frequencies as compared with the second generation of fluid-contained engine mounting devices. Conventionally, in order to control noises and vibrations which the vehicle bodies generate and are distinctive in a specific range of vibration frequencies due to resonant vibrations between the vehicle body and engine brackets, it was popular to use dynamic dampers. As shown in FIG. 32, the third generation of fluid-contained engine mounting device C is almost the same in structure as the second generation of fluid-contained engine mounting device excepting that a generally parabolic-shaped canopy C11 is provided. This generally parabolic-shaped canopy C11 serves to reduce the vibration transmission efficiency Kt for vibrations in a specific range of frequencies so as to keep the vehicle as quiet as possible. As apparent from FIG. 33, the third generation of fluid-contained engine mounting device C shows the efficiency of vibration transmission diminished for vibrations in the specific range of high frequencies as compared with that of the second generation, reducing the transmission of, in particular, noises to the vehicle body.

One of prior art engine mounting devices is that described in Japanese Unexamined Patent Publication No. 60-139507. This prior art engine mounting device includes outer and inner hollow cylindrical tubes disposed coaxially and a cylindrical elastic member disposed between these outer and inner hollow cylindrical tubes to form more-than-two fluid chambers. These fluid chambers are communicated with each other by means of a suspension arm which is attached to and supported by the vehicle body. A gas is confined in either one of the fluid chambers. With the cylindrical bush type engine mounting device, the fluid in the fluid chambers is allowed to change in pressure due to compression of the gas, enabling the spring constant of the fluid in the fluid chamber to change according to vibrations transmitted to the cylindrical bush type engine mounting device. This results in an improvement that the degree of freedom of setting the frequency at which vibrations are well isolated due to fluid resonance is increased.

In the engine mounting device described in Japanese Unexamined Patent Publication No. 60-139507 which comprises an integral cylinder-shaped bush with more-than-two fluid chambers defined by the elastic members functioning as springs, if only either one of the fluid chambers contains a gas, the elastic member has a spring constant increased in excess in the event where the orifice is clogged, incapacitating the engine mounting device apparatus for sufficient vibration attenuation. In order for the engine mounting device apparatus to overcome the drawback, while it is thought to reduce spring constants for both fluid chambers, nevertheless, hard constraints must be imposed on the structure of integral cylinder-shaped bush. In addition, it is also thought to contain a gas in another fluid chamber. In the engine mounting device apparatus, however, the gas in the one fluid chamber possibly penetrates into the other fluid chamber through the orifice during assembling the engine mounting device apparatus to a vehicle, or due to shaking itself. In such an event, the engine mounting device apparatus is incapacitated for vibration attenuation. Together, it is hard to care the gas contained in the engine mounting device apparatus.

In the fluid-contained engine mounting devices of, in particular, the first and second generations, there must be indispensably provided a generally rigid partition having an elastic part made of an elastic rubber membrane or an elastic parabolic-shaped canopy member fitted to a top member through which the engine mounting device is secured to the vehicle body, which always leads to high costs.

SUMMARY OF THE INVENTION

It is an object of the present invention to provide an engine mounting device which is able to change vibration transmission efficiency and vibration attenuation efficiency according to confined gas a quantity so as to provide an effective reduction in engine noises.

It is another object of the present invention to provide an engine mounting device which is able to provide an increase in attenuation efficiency for vibrations of high frequencies so as to yield an improved vibration reduction.

It is still another object to provide a method of confining a desired quantity of a gas in an engine mounting device.

The above objects of the present invention are achieved by providing a fluid-contained engine mounting device, which contains a fluid in a fluid container closed up air-tightly by wall means including at least a rigid cylindrical wall, an elastic top wall and an elastic bottom wall consisting of an elastic diaphragm, for mounting an engine on a vehicle body and absorbing vibrations of the engine transmitted thereto by means of expansion and contraction of the elastic top and bottom walls and the fluid. The fluid container is divided by a partition wall into a first fluid chamber closed by the elastic top wall and a second fluid chamber closed by the elastic bottom wall. At least one of the wall means is formed with a gas pocket for holding a predetermined quantity of a gas, such as air and an inert gas, before assembling the wall means to the fluid container placed upside down and filled with the fluid and releasing the gas into the fluid when erecting the fluid container after having assembled the fluid container. When the gas is released, the gas moves into the first fluid chamber through an orifice formed in the partition wall which allows the fluid to move between the first and second fluid chambers due to expansion and contraction of the elastic top and bottom walls.

Specifically, the gas pocket means may be formed as a dent, or a closed air chamber having an orifice, in the partition wall so as to accumulate air therein before the partition wall is installed into the fluid container placed upside down and filled with the fluid. Otherwise, the gas pocket is formed as an open air chamber between a periphery of the elastic bottom wall and the rigid cylindrical wall so as to contain air therein when the elastic diaphragm is installed into and secured air-tightly to the fluid container placed upside down and filled with the fluid. The air is released directly into the fluid when erecting the fluid container. Alternatively, the gas pocket means is formed as an open air chamber in the rigid cylindrical wall so as to contain air therein when the partition wall is installed halfway into the fluid container placed upside down and empty of a fluid. The air is released into the fluid when the partition wall is installed into a full position after having filled the fluid container with the fluid.

The quantity of the gas confined in the first fluid chamber is determined so that the first fluid chamber functioning as an expansive spring reduces a spring constant thereof to more-than-50% but less-than-75% as compared with the engine mounting device empty of a fluid. Specifically, the first fluid chamber confines therein the gas of 0.5 to 7 cc, more desirably, of 3 cc.

The engine mounting device is manufactured by a method comprising the steps of filling the fluid container closed at a top by the elastic top wall and placed upside down with a fluid, installing the partition wall and the elastic bottom wall in order so as to assemble and close up the fluid container air-tightly, holding a predetermined quantity of a gas in the pocket until the container is assembled, and releasing the gas into the fluid container from the air pocket after completing the fluid container. In place of confining directly a gas in the fluid container, a predetermined quantity of irreversibly gasifying material capable of gasifying at a room temperature or a higher temperature may be put in the fluid. The fluid is warmed to the room temperature so as to gasify the material, thereby confining a predetermined quantity of a gas in the first fluid chamber.

After having confined a gas in the fluid container, an additional gas may be injected so as to make up a deficit in gas quantity in the fluid container or adjust the vibration attenuation efficiency of the engine mounting device.

The gas to be confined in the fluid container may not only be inert gases but also be any gas hardly soluble in the fluid.

With the engine mounting device according to the invention, both vibration transmission efficiency and vibration attenuation efficiency are determined according to a confined gas quantity. This enables the engine mounting device to have, on one hand, vibration transmission efficiency suitable to exhibit effective noise reduction performance and, on the other hand, vibration attenuation efficiency increased as high as to improve vibration reduction performance.

Further, the engine mounting device according to the present invention, a predetermined quantity of a gas is confined in the fluid container easily and certainly by a simple sequential manner.

BRIEF DESCRIPTION OF THE DRAWINGS

The above and other objects and features of the present invention will be clearly understood from the following description with respect to a preferred embodiment thereof when considered in conjunction with the accompanying drawings, in which same reference numerals having used therein denote the same or similar parts or elements throughout the drawings and wherein:

FIG. 14 is a table showing a result of noise reduction evaluation according to confined gas quantity;

FIG. 15 is a table showing a result of vibration reduction evaluation according to confined gas quantity;

DETAILED DESCRIPTION OF THE PREFERRED EMBODIMENTS

Figure 1A:
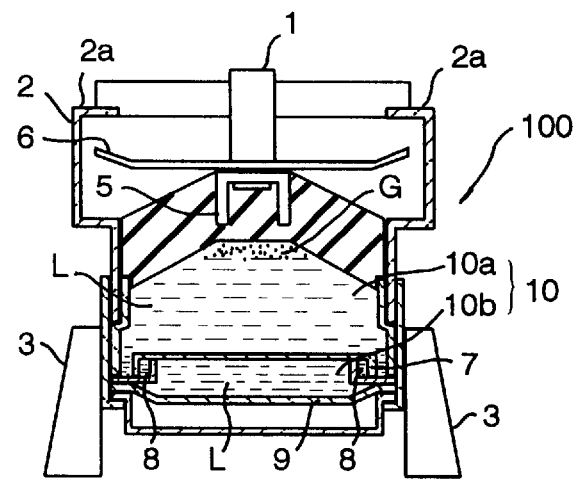
FIG. 1A is a cross-sectional view of an engine mounting device in accordance with a preferred embodiment of the present invention.
Figure 1B:
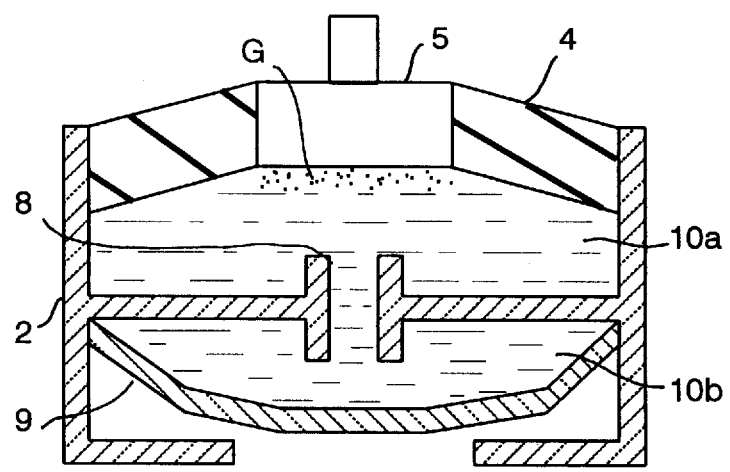
FIG. 1B is a schematic illustration showing a simplified model of the engine mounting device of FIG. 1A.

Referring now to the drawings in detail, and in particular, to FIG. 1A, a fluid-contained engine mounting device 100 according to a preferred embodiment of the present invention is shown. A simplified model of the fluid-contained engine mounting device 100 is shown in FIG. 1B. The engine mounting device 100 comprises an engine connecting member 1 by which the engine mounting device 100 is attached to an engine (not shown) in an engine compartment, a generally cylindrically-shaped, rigid fluid container 2 and a vehicle body connecting member 3 through which the engine mounting device 100 is attached to a chassis of the vehicle body (not shown). In this instance, these members 1–3 form an external shape of the engine mounting device 100. The engine connecting member 1 is bolted, or otherwise secured, at its one end to the engine and secured at its another end to a disk-like or canopy-shaped elastic rubber pad 4 by a fitting 5. A disk-shaped stopper member 6 is secured to the top of the elastic rubber pad 4. The cylindrical fluid container 2 is formed with an annular flange 2a extending laterally inward to define a top opening. The elastic rubber pad 4 is fitted in and secured fluid-tightly to the cylindrical fluid container 2 so as to form a fluid chamber 10 in which fluid L is confined and is deformable due to a change in pressure of the fluid L in the fluid container 2. Because of such deformation, the elastic rubber pad 4 functions as an expansive "spring." This fluid chamber 10 is divided by means of a partition wall 7 into two fluid chambers, namely a first or upper fluid chamber 10a defined by the elastic rubber pad 4 as a top wall and a second or lower fluid chamber 10b. This partition wall 7 is provided with a fluid path, serving as an orifice 8, defined by a spiral wall for fluid communication between these first and second fluid chambers 10a and 10b. The engine mounting device 100 has a dome-shaped elastic diaphragm 9 provided between the partition wall 7 and the bottom of the fluid container 2 so as to form an deformable bottom wall of the second fluid chamber 10b. This bottom diaphragm 9 is capable of expanding and contracting due to a change in hydraulic pressure in the fluid container 2.

In this instance, a predetermined amount, for instance approximately 0.5 to 7 cc, of an inert gas G, such as a helium gas, having no chemical reaction on the elastic rubber pad 4, air and the fluid L, is forcibly confined within the first fluid chamber 10a so as to be in direct contact with the fluid L. It is to be understood that the gas G may be of any kind which is hardly soluble in air and the fluid L and the confined amount of gas G may vary according to types and/or weight of engines. If the elastic rubber pad 4 causes upward deformation beyond a predetermined level due to vibrations transmitted thereto, the stopper 6 is brought into abutment against the flange 2a so as to restrict the deformation of the elastic rubber pad 4.

Vibration Transmitting Characteristics

It is essential for the elastic rubber pad 4 to have a fundamental function to substantially support the engine thereon and absorb vibrations generated by the engine and the vehicle body chassis. In general, as was previously described, with an increase in the supporting rigidity of an engine mount, the engine mount yields a decline in the expansive stiffness of the first fluid chamber which in turn indicates the degree of facility in expansion of the first fluid chamber. Such a decline in the expansive stiffness provides an increase in the efficiency of vibration transmission, leading to aggravation of vibration control and rendering the engine mount easy to transmit engine vibrations. In order for the engine mounting device 100 to have reduced expansive stiffness, the gas G is confined in the first fluid chamber 10a. The gas G performs the function of restraining deformation of the elastic rubber pad 4, and hence expansion and contraction of the first fluid chamber 10a, by virtue of its own compressive property, so that the engine mounting device 100 yields a reduction in the efficiency of transmission of vibrations in both ranges of high and low frequencies.

Vibration Attenuation

Due to deformation of the elastic rubber pad 4 caused by vibrations in the range of low frequencies, the fluid L moves between the first and second fluid chambers 10a and 10b through the orifice 8. If vibrations are in a specific range of frequencies, the fluid L causes a resonant vibration in the orifice 8, blocking the orifice 8. That is, the resonant vibration of the fluid yields an enhanced attenuation of vibrations in the specific range of frequencies. However, as is well known, as the efficiency of vibration transmission is enhanced, the frequency at which the engine mounting device 100 provides the greatest efficiency of vibration attenuation tends to become high, adversely affecting the vibration control function of the engine mounting device 100. The gas G confined in the first fluid chamber 10a also performs to diminish the transmission of vibrations in a specific range of low frequencies, i.e. to reduce the expansive stiffness of the first fluid chamber 10a, so as thereby to yield enhanced efficiency of vibration attenuation and improve the vibration control function of the engine mounting device 100.

Figure 2A:
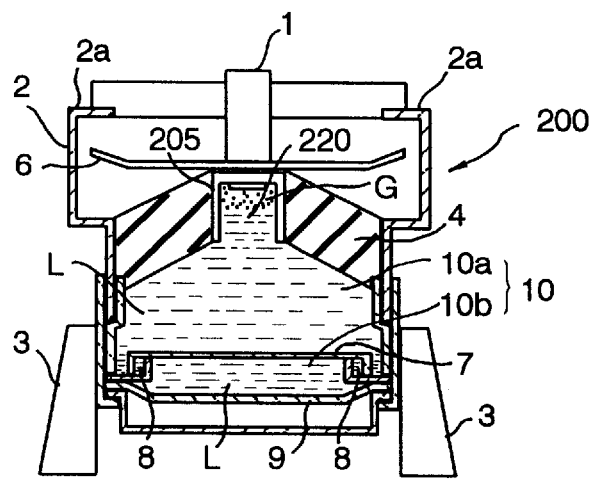
FIG. 2A is a cross-sectional view of an engine mounting device in accordance with another preferred embodiment of the present invention.
Figure 2B:
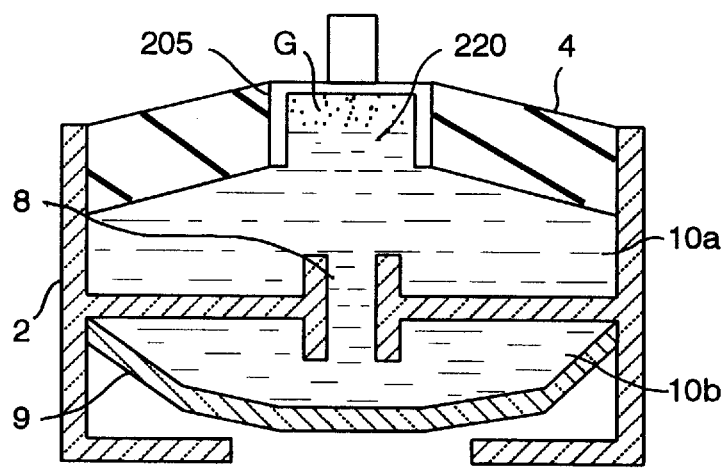
FIG. 2B is a schematic illustration showing a simplified model of the engine mounting device of FIG. 2A.

FIG. 2A shows a fluid-contained engine mounting device 200 according to another preferred embodiment of the present invention. A simplified model of the fluid-contained engine mounting device 200 is shown in FIG. 2B. This engine mounting device 200 is almost similar in structure to that of the previous embodiment, excepting only the difference in configuration of an first fluid chamber 10a. Specifically, an elastic rubber pad 4 is formed therein with a third fluid chamber 220 which in turn provides a fluid column on the top of the fluid in the first fluid chamber 10a. The third fluid chamber 220 is defined by a cylindrical cap-shaped fitting 205. This cap-shaped fitting 205 with its opening facing downward is fitted into the elastic rubber pad 4 and bolted, or otherwise secured, to an engine connecting member 1. This third fluid chamber 220 is configured so as to be larger in cross-sectional area than an orifice 8 but smaller than the first fluid chamber 10a. An inert gas G having no chemical reaction on the elastic rubber pad 4 and the fluid F, such as a helium gas, is forcibly confined within the third fluid chamber 220 so as to be in direct contact with the fluid column. The column of gas G and fluid L in the third fluid chamber 220 functions as a sort of air device which causes resonant vibrations of the column of fluid.

The cap-shaped fitting 205 has the effect that it prevents the gas G from escaping through the elastic rubber pad 4 which tends to become porous with a lapse of time.

Vibration Transmissibility

The gas G at the head of the fluid column in the third fluid chamber 220 performs, by virtue of its own compression characteristic, the function of reducing the expansive stiffness of the first fluid chamber 10a due to deformation of the elastic rubber pad 4, so that the engine mounting device 200 yields a reduction in the efficiency of transmission of vibrations in both ranges of high and low frequencies. Together, the column of gas G and fluid L in the third fluid chamber 220, which functions as an air device, serves as a substitutive device for dynamic dampers conventionally used to control noises and vibrations distinctive in a specific range of frequencies occurring due to resonant vibrations of the vehicle body and engine brackets. Specifically, the column of gas G and fluid L in the third fluid chamber 220 causes resonant vibrations responding to vibrations in a specific range of high frequencies by virtue of the compression characteristic of the gas G. The third fluid chamber 220 is configured so as to cause resonant vibrations of the column of gas G and fluid L at a frequency larger than a resonant vibration frequency of a fluid column in the orifice 8. The engine mounting device 200 thus structured yields a reduction in the efficiency of transmission of vibrations in the specific range of high frequencies.

Vibration Attenuation

Because the gas G confined in the third fluid chamber 220 also performs to diminish the efficiency of transmission of vibrations in a specific range of low frequencies, i.e. to reduce the expansive stiffness of the first fluid chamber 10a, the engine mounting device 200 yields an enhanced efficiency of vibration attenuation and, consequently, improves the vibration control function.

Figure 3A:
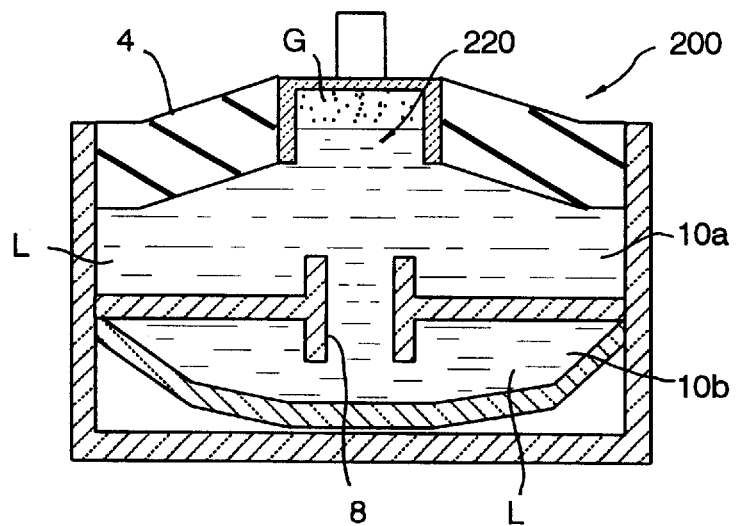
FIG. 3A is a cross-sectional view of a model of the engine mounting device of FIG. 2B.
Figure 3B:
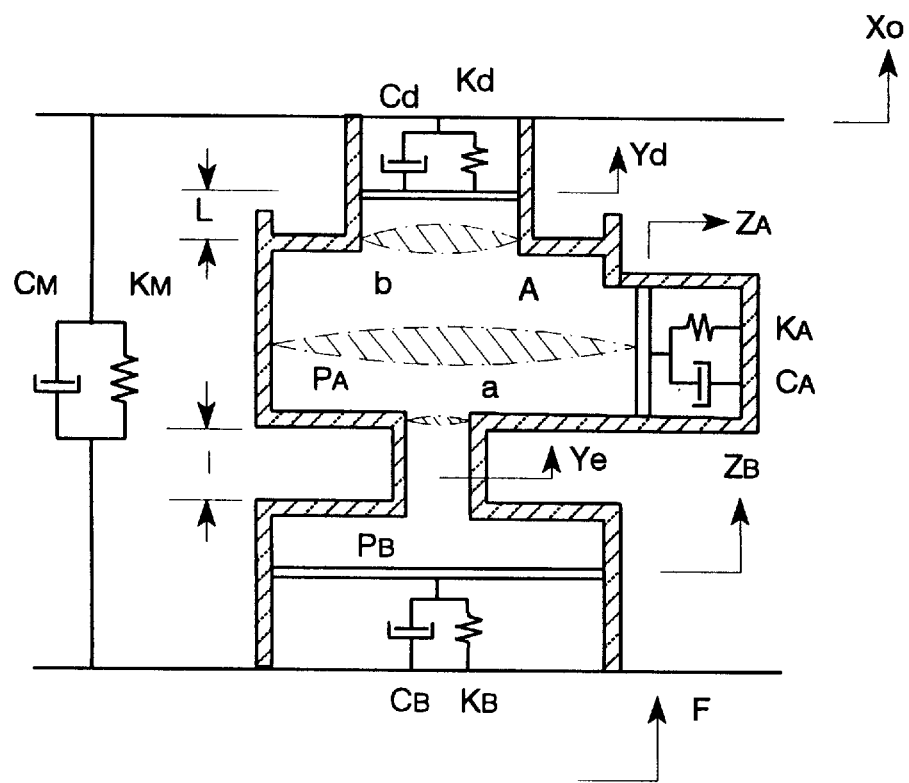
FIG. 3B is an equivalent circuit diagram of the model of FIG. 3A.
Figures 4, 5:
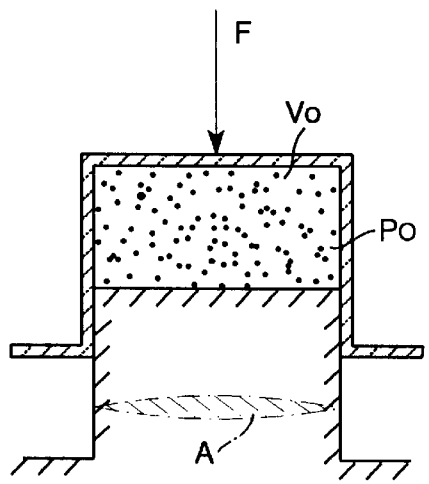
FIG. 4 is a cross-sectional view of a model of air spring.
FIG. 5 is a table of parameters for the model of the engine mounting device of FIG. 3A.

For the purpose of providing an understanding of the principle of the engine mounting devices shown in FIGS. 1A and 2A, reference is made to FIGS. 3A, 3B and 4. FIGS. 3A and 3B show a theoretical model of the engine mounting device shown in FIG. 2A and an equivalent circuit of the theoretical model, respectively. FIG. 4 shows a theoretical model of an air spring, in which reference signs Vo, Po and A indicate the volume of fluid, the pressure of fluid and the cross-sectional area of a fluid chamber, respectively. The spring constant K is given by the following equation:

$$K = \gamma \cdot (Po/Vo) \cdot A^2$$

where $\gamma$ is the polytrope exponent.

The mass of fluid md in the air device and the mass of fluid Me in the fluid chambers are given by the following equations, respectively:

$$Md = \rho \cdot b \cdot L \quad (1)$$

$$Me = \rho \cdot a \cdot 1 \quad (2)$$

where $\rho$ is the density of the fluid;

L is the length of the air device; and 1 is the length of the orifice.

The following equations of motion should hold in the equivalent circuit of the theoretical model shown in FIG. 3B:

$m_d \cdot \ddot{y}_d + c_d(\dot{y}_d - \dot{x}_o) + k_d(y_d - x_o) - b \cdot P_A = 0$ $m_e \cdot \ddot{y}_e + c_e \cdot \dot{y}_e + a(P_A - P_B) = 0$ $C_A \cdot \dot{Z}_A + K_A \cdot Z_A - A \cdot P_A = 0$ $C_B \cdot \dot{Z}_B + K_B \cdot Z_B - A \cdot P_B = 0$ $A \cdot \dot{Z}_A + A \cdot \dot{x}_o + b(\dot{y}_d - \dot{x}_o) - a \cdot \dot{y}_e = 0$ $a \cdot y_e - A \cdot Z_B = 0$ where $y_d$ is the deflection of the air device;

$c_d$ is the attenuation factor of the air device;

$x_o$ is the deflection of the third fluid chamber;

$k_d$ is the spring constant of the air device;

b is the cross-sectional area of the air device;

$P_A$ is the fluid pressure in the first fluid chamber;

$y_e$ is the deflection of a fluid column in the orifice;

$c_e$ is the attenuation factor of a fluid column in the orifice;

a is the cross-sectional area of the orifice;

$P_B$ is the fluid pressure in the second fluid chamber;

$C_A$ is the attenuation factor of the elastic rubber pad;

$\dot{Z}_A$ is the deflection of the elastic rubber pad;

$K_A$ is the spring constant of the elastic rubber pad;

A is the cross-sectional area of the first fluid chamber;

$C_B$ is the attenuation factor of the diaphragm;

$\dot{Z}_B$ is the deflection of the diaphragm; and $K_B$ is the spring constant of the diaphragm. In FIG. 3B, reference signs $C_M$, $K_M$ and F indicate the attenuation factor of the engine mounting device 200, the spring constant of the engine mounting device 200, and the force acting on the engine mounting device 200, respectively.

The equivalent mass $M_D$ and $M_E$ with regard to the model of air spring shown in FIG. 4 are expressed as follows:

$$M_D = (A/b)^2 \cdot m_d \quad M_E = (A/a)^2 \cdot m_e \quad (3)$$

The equivalent attenuation factors $C_D$ and $C_E$ with regard to the model of air spring shown in FIG. 4 are expressed as follows:

$$C_D = (A/b)^2 \cdot c_d$$

$$C_E = (A/a)^2 \cdot c_e \quad (4)$$

Since the spring constant K is given by the following equation:

$$K = \gamma \cdot (Po/Vo) \cdot A^2$$

the equivalent spring constant with regard to the model of air spring is expressed as follows:

$$K_D = (A/b)^2 \cdot k_d = (A/b)^2 \cdot (\gamma \cdot Po \cdot b^2/Vo) = \gamma \cdot Po \cdot A^2/Vo \quad (5)$$

The equivalent displacement $Y_D$ and $Y_E$ with regard to the model of air sprint are expressed as follows:

$$Y_D = (b/A) \cdot y_d \quad Y_E = (a/A) \cdot y_e \quad (6)$$

By solving the equation of motion by the Laplace transform by use of the above equations (3)–(6), the following equivalent equations are obtained:

$[M_D \cdot S^2 + (C_D + C_A) \cdot S + K_D + K_A] \cdot Y_D - (C_A \cdot S + K_A) \cdot Y_E = [b/A \cdot (C_D \cdot S + K_D) - (A-b)/A \cdot (C_A \cdot S + K_A)] \cdot x_0$ $[M_E \cdot S^2 + (C_E + C_A + C_B) \cdot S + K_A + K_B] \cdot Y_E - (C_A \cdot S + K_A) \cdot Y_D = [(A-b) \cdot (C_A \cdot S + K_A)/A] \cdot x_0$ where S is the Laplace operator.

Figure 6:
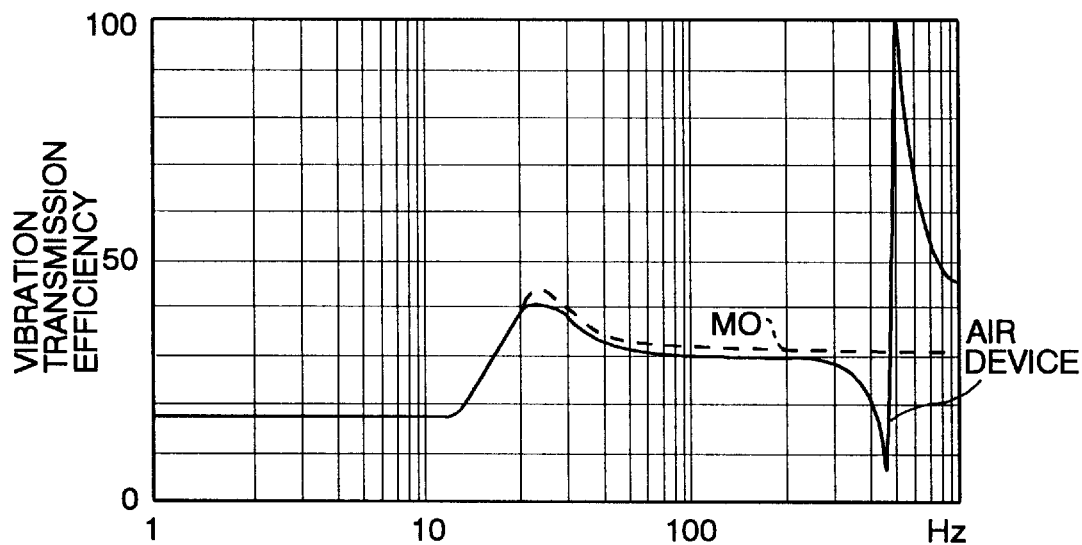
FIG. 6 is a graph showing vibration transmission characteristic of the simplified model of FIG. 3B.
Figure 7:
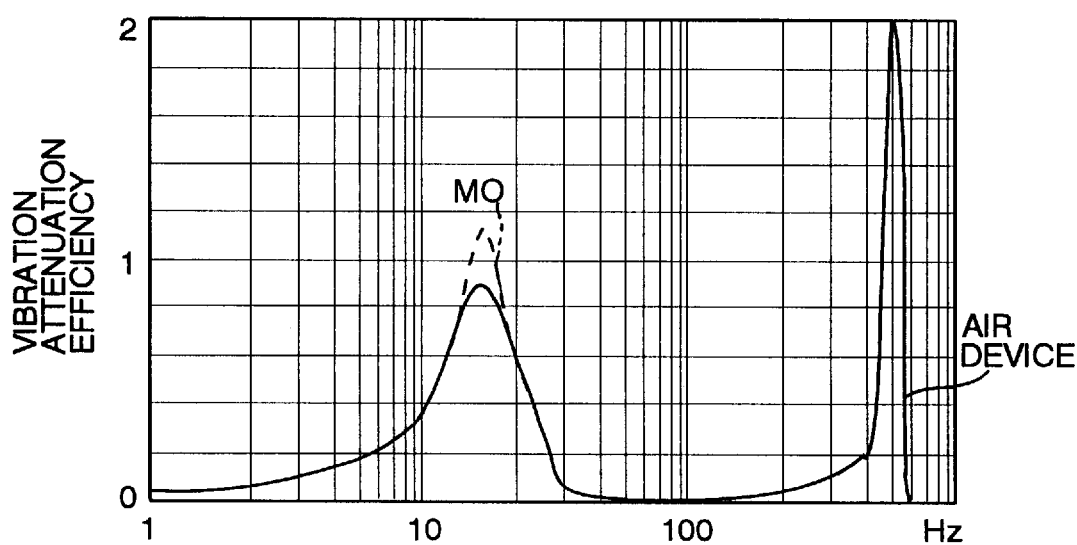
FIG. 7 is a graph showing the vibration attenuation characteristic of the simplified model of FIG. 3B.

As shown in FIGS. 6 and 7, the resultant vibration transmission and the resultant vibration attenuation are obtained, respectively, for various parameters for the model of the engine mounting device 200 shown in FIGS. 3A and 3B which are set as indicated in FIG. 5. In FIGS. 5–7, reference sign M0 indicates a prior art engine mounting device of the second generation. As was described previously, when the engine mounting device 200 shown in FIGS. 2A and 2B contains a gas G of 1 cc in the third fluid chamber 220, the column of fluid L in the third fluid chamber 220 causes resonant vibrations in a specific range of high frequencies due to air compression. Since the resonant frequency of a fluid column in the third fluid chamber 220, functioning as an air device, is set to be higher than that of a fluid column in the orifice 8, the fluid column resonates responsive to vibrations in the specific range of high frequencies, so that the engine mounting device 200 provides a reduced efficiency of transmission Kt or |F/xo| for vibrations at specific frequencies, for instance approximately 400 Hz. Together, by providing a reduced efficiency of transmission Kt or |F/xo| for vibrations in a specific range of frequencies, for instance, approximately from 10 to 20 Hz due to the contraction of the gas G in the third fluid chamber 220, the engine mounting device 200 provides high efficiency of vibration attenuation Tan δ in the range of frequencies from 10 to 20 Hz as shown in FIG. 7.

FIGS. 8–12 show results of an efficiency test for the fluid-contained engine mounting device 200 according to the present invention. Since it is considered that there is no significant difference in weight between various models of engines, a moderate weight of engine was used in the efficiency test.

Figure 8:
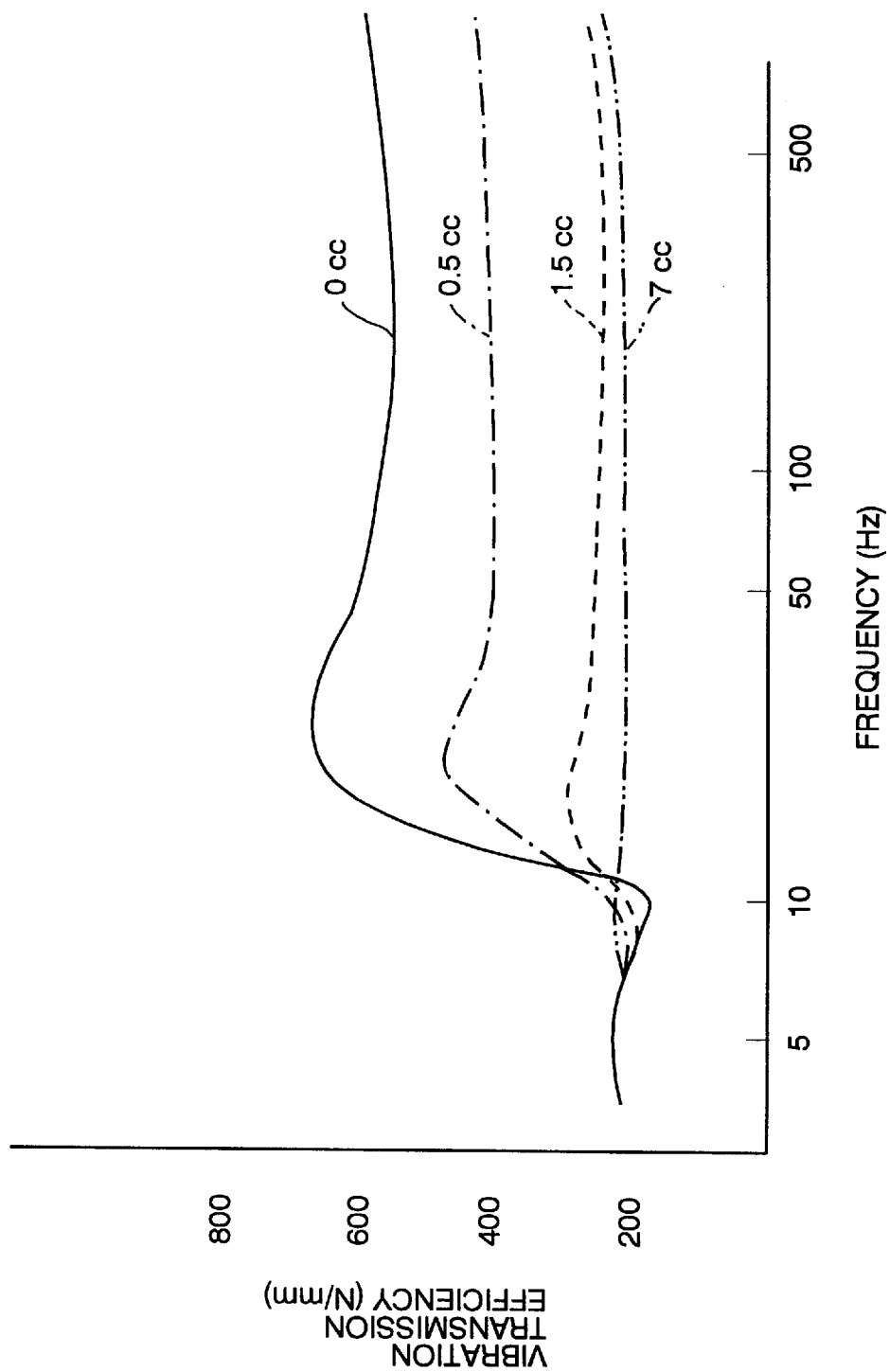
FIG. 8 is a graph showing vibration transmission efficiency with respect to vibration frequency for various confined gas quantities.
Figure 9:
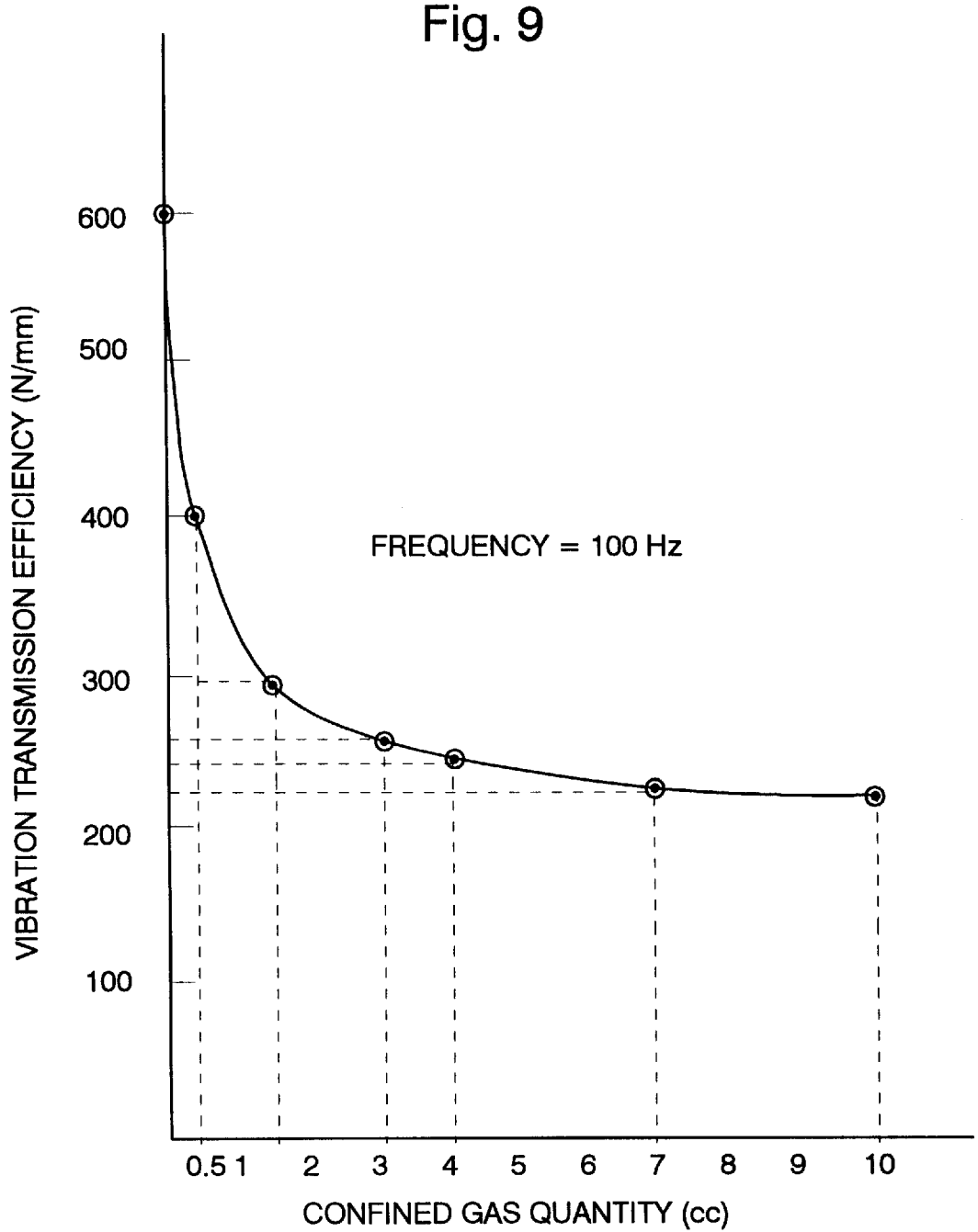
FIG. 9 is a graph showing a change in vibration transmission efficiency with respect to confined gas quantity for a vibration frequency of 100 Hz.

FIG. 8 shows vibration transmission efficiency with respect to vibration frequency of engine mounting devices 200 containing a gas G of 0.5 cc, 1.5 cc and 7 cc in comparison with the engine mounting devices 200 not containing a gas. FIG. 9 shows vibration transmission efficiency with respect to confined gas amount of the engine mounting devices 200 for a vibration of 100 Hz. These engine mounting devices 200 show peaks of vibration transmission efficiency at frequencies higher than approximately 10 Hz. The engine mounting device 200 not containing a gas shows the highest peak of vibration transmission efficiency. With an increase in confined gas amount, the peak of vibration transmission efficiency drops. This indicates that the greater the confined gas amount is, the more facilely the engine mounting device 200 absorbs external vibrations. In other words, as the amount of confined gas increases, while the engine mounting device 200 reduces noises, nevertheless, it causes deterioration in vibration attenuation efficiency. As shown in FIG. 9, for a vibration transmitted to the engine mounting device 200 at a frequency of 100 Hz, the engine mounting device 200 shows a drop of approximately 25% in vibration transmission efficiency from 400 (N/mm) when containing 0.5 cc of a gas to 300 (N/mm) when containing 1.5 cc of a gas. Similarly, the engine mounting device 200 shows a drop of approximately 32% in vibration transmission efficiency from 400 (N/mm) when containing 0.5 cc of a gas to 270 (N/mm) when containing 3 cc of a gas. As understood in FIG. 9, while a drop in vibration transmission efficiency becomes gradually larger with an increase in confined gas amount to 7 cc, it does not change the vibration transmission efficiency for confined gas amounts larger than 7 cc. That is, when the engine mounting device 200 contains a gas more than 7 cc, it performs its supporting function only.

Figure 10:
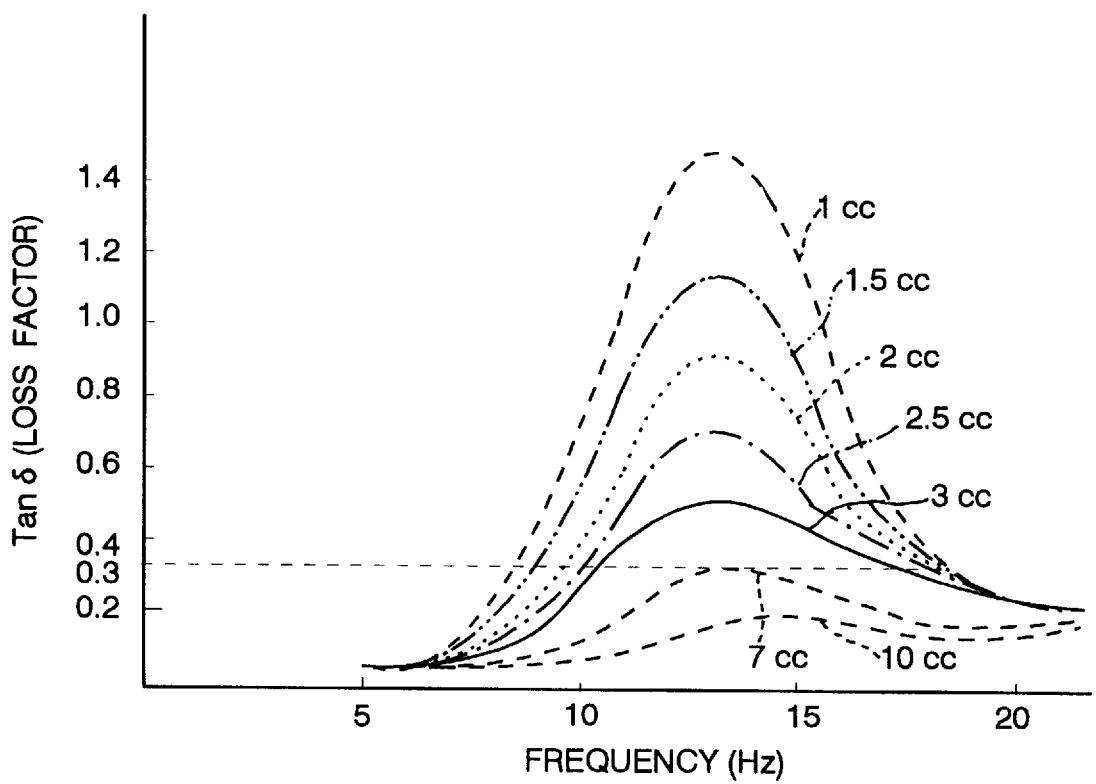
FIG. 10 is a graph showing vibration attenuation characteristics with respect to vibration frequency for various confined gas quantities.
Figure 11:
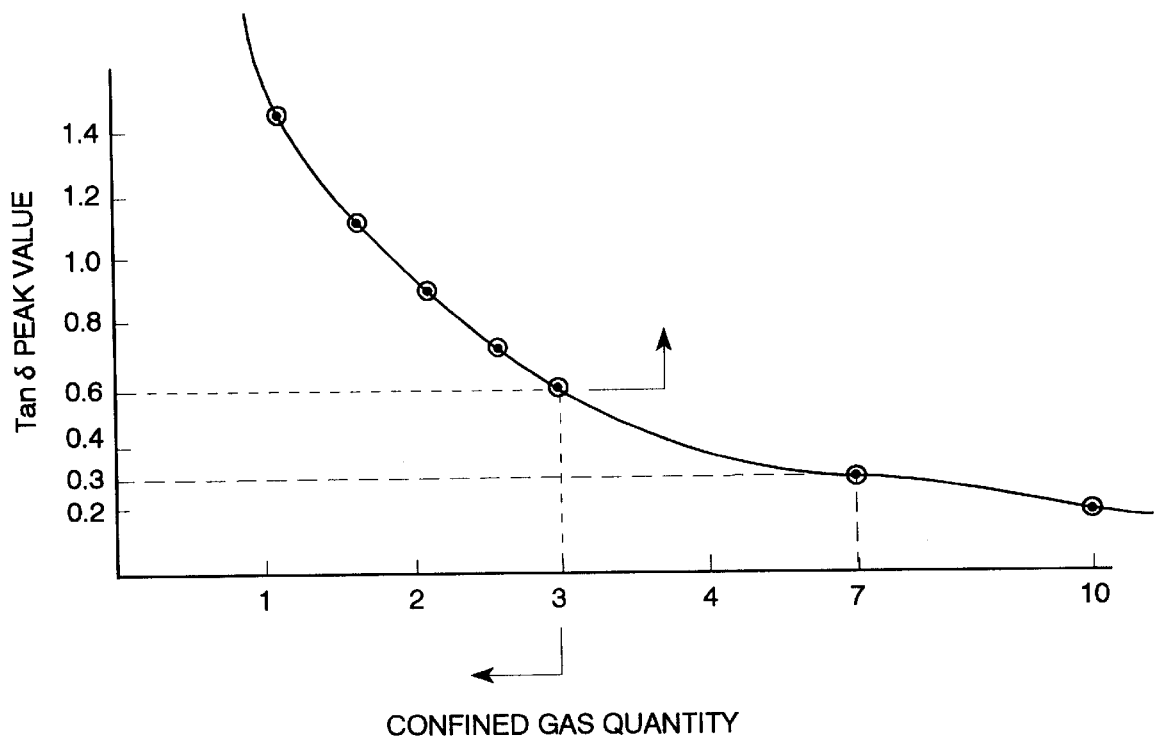
FIG. 11 is a graph showing a change in peal vibration attenuation efficiency with respect to confined gas quantity.

FIG. 10 shows vibration attenuation efficiency with respect to vibration frequency of engine mounting devices 200 containing a gas G of 1 cc, 1.5 cc, 2 cc, 3 cc, 7 cc and 10 cc respectively. FIG. 11 shows a change in peak of vibration attenuation efficiency with respect to confined gas amount of the engine mounting device 200. The engine mounting device 200 provides a peak of vibration attenuation efficiency which declines from approximately 1.4 for a confined gas amount of 1 cc to approximately 0.3 for a confined gas amount of 7 cc. This indicates that, as the confined gas amount becomes greater, the engine mounting device 200, on one hand, provides deterioration in vibration attenuation efficiency and, on the other hand, reduces noises.

Figure 12:
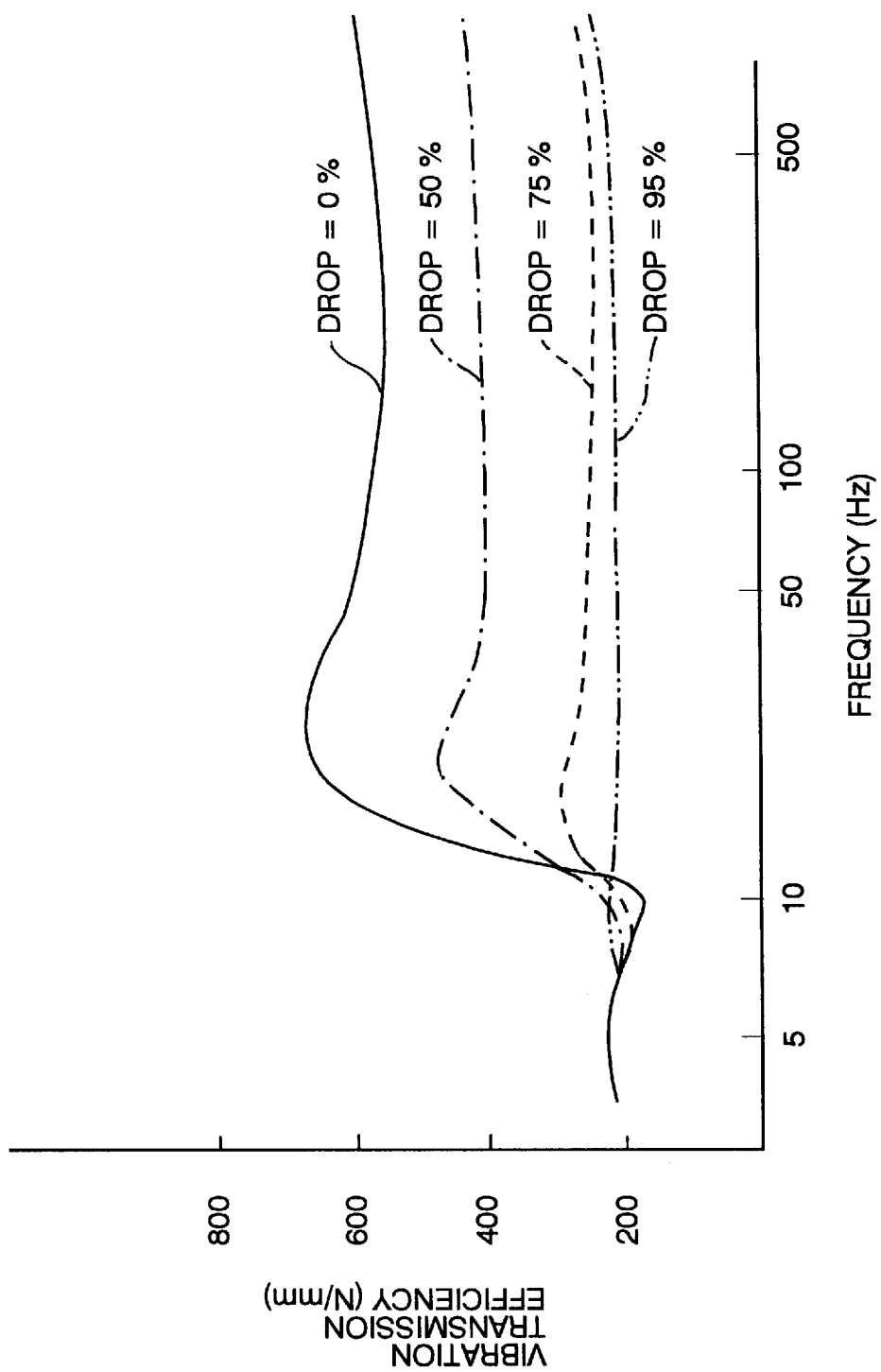
FIG. 12 is a graph showing vibration transmission characteristic for a drop in expansive stiffness changeable due to confined gas quantity.

FIG. 12 shows vibration transmission efficiency with respect to expansive stiffness of engine mounting devices 200 containing a gas G of 0.5 cc, 1.5 cc and 7 cc respectively in comparison with an engine mounting device 200 not containing a gas. As compared with an engine mounting device 200 not containing a gas G, an engine mounting device 200 provides a drop in expansive stiffness of 50% when containing a gas G of 0.5 cc, 75% when containing a gas G of 1.5 cc, and 95% when containing a gas G of 7 cc. This indicates that the engine mounting device 200 increases a drop in vibration attenuation efficiency with an increase in confined gas qyantity and, consequently, changes its vibration transmission efficiency depending upon elastic moduli of the first fluid chamber 10a, specifically the elastic rubber pad 4 of the first fluid chamber 10a, and the confined gas G. From the fact, it is concluded that the engine mounting device 200 enhances its supporting function.

According to the result of the efficiency test, the engine mounting device 200 yields high vibration transmission efficiency when containing a gas less than 0.5 cc and does not provide a change in vibration transmission efficiency when containing a gas more than 7 cc. With regard to noises, the confined gas quantity is desirable to be more than 0.5 cc but less than 7 cc. Together, as understood clearly from FIG. 11, since the engine mounting device 200 absorbs efficiently engine vibrations when having vibration attenuation efficiency (Tan δ) higher than 0.6, the confined gas quantity is desirable to be less than 3 cc. From the facts described above, it is concluded clearly that the quantity of a gas to be confined in the engine mounting device 200, designed according to particular parameters indicated in FIG. 5, is desirable to be between 0.5 cc and 3 cc. It is of course that the confined gas quantity may be changed according to changes in parameters of the engine mounting device 200 due to engine models and application circumstances.

Figure 13:
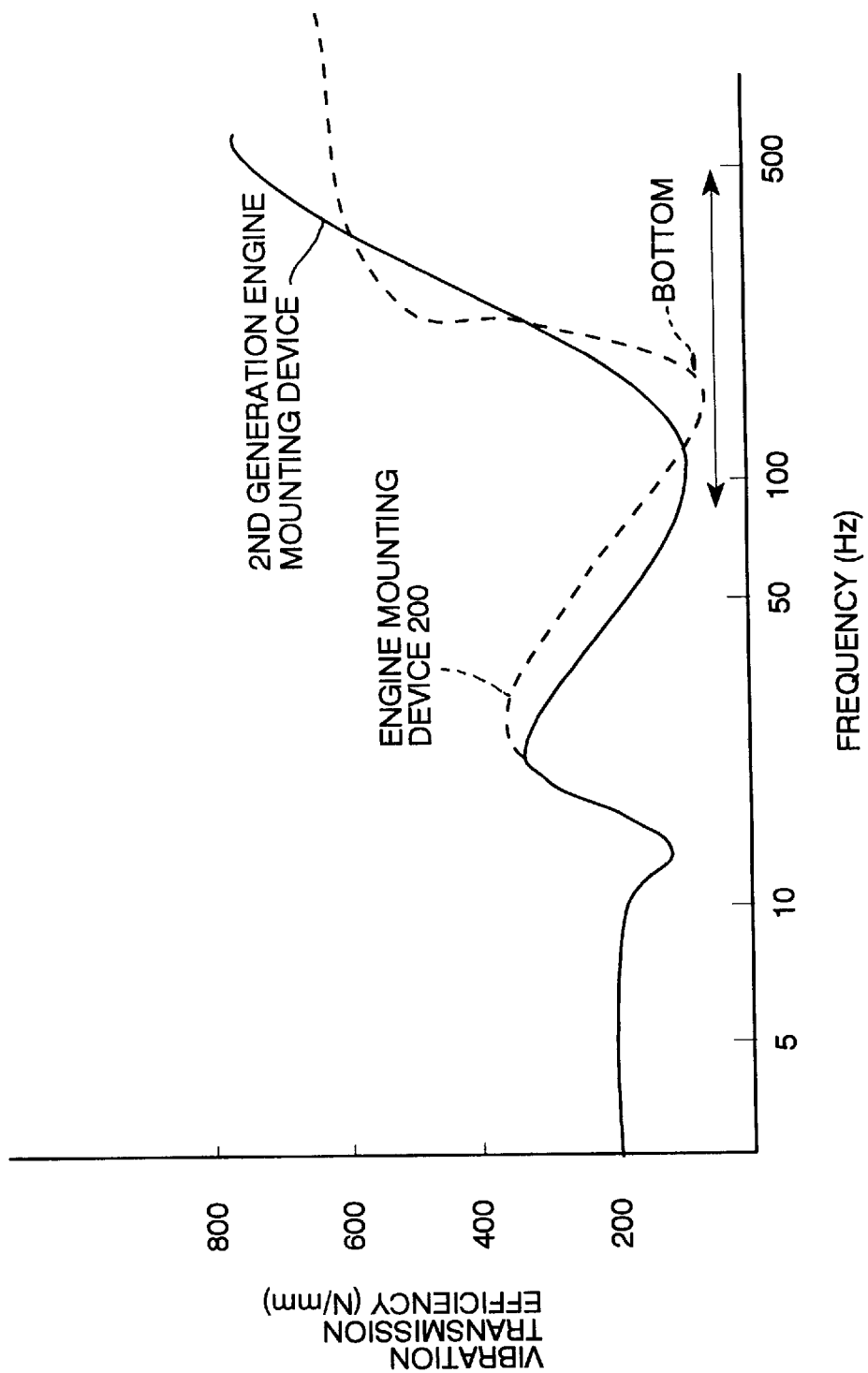
FIG. 13 is a graph showing vibration transmission characteristics for a comparison of the engine mounting device of the present invention with the prior art engine mounting device.

FIG. 13 shows curves of the vibration transmission characteristic of the engine mounting device 200 of the present invention depicted in FIG. 2A and the prior art engine mounting device B of the second generation. The column of fluid L and gas G in the third fluid chamber 220 is provided and tuned so as to place a bottom portion of the vibration transmission characteristic curve within a band of frequencies of vibrations which the engine mounting device 200 is intended to reduce effectively. The parameters of the engine mounting device 200 including the quantity of a confined gas and the cross-sectional area of the fluid chamber are established so as to define the bottom frequency band between 80 and 500 Hz. This is because, noises of frequencies less than approximately 80 Hz are hardly audible. Further, if brackets, by means of which the engine mounting device 200 is usually bolted to an engine, resonate on frequencies less than 500 Hz, they generate hazy noises which are always unpleasant. Accordingly, in order for the engine mounting device 200 to reduce hazy noises which are caused by vibrations generated during driving as low as possible and make unpleasant noises hardly audible, the vibration transmission characteristic curve is established so as to place its bottom portion within a band of frequencies between 80 and 500 Hz.

Typically, fluid-contained engine mounting devices tend to allow the fluid to change its flowing pattern according to amplitude and frequency of an external force which is affected by a resonance of a fluid column in the orifice communicating two fluid chambers and viscosity resistance of the fluid. For example, if a sluggish external force is applied, the fluid is less affected by a resonance of the fluid column and viscosity resistance of the fluid, flowing into one of the fluid chambers, which is at a pressure lower than another, fluid chamber. On the other hand, if an external force is applied on a frequency higher than the resonant frequency of the fluid column, the fluid does not flow through the orifice, i.e. blocks the orifice.

As apparent from the above discussion, the engine mounting device 200 contains a gas in a fluid chamber from which the fluid flows out upon a sluggish effect of an external force. However, the prior art engine mounting device such as described in Japanese Unexamined Patent Publication No. 60-139507 contains a gas in a fluid chamber into which the fluid flows upon a sluggish effect of an external force. This is a significant and thorough difference of the engine mounting device 200 of the present invention from the prior art engine mounting device.

Comparing these engine mounting devices in an aspect of performance, the outflow of a fluid or the inflow of a fluid occurs due to the difference between spring constants of the fluid chambers functioning as expansive springs. That is, it is considered that a fluid flows from one of the two fluid chambers, having a spring constant larger than another, to the other. Accordingly, since, in a band of high frequencies of vibrations which cause noises, the orifice is blocked, the engine mounting device becomes easier to generate noises as the spring constant is higher. In the engine mounting device 200 which contains a gas in one of the two fluid chambers having a spring constant greater than another, a significant noise reduction effect is achieved by assigning the fluid chamber a low spring constant, i.e. providing for the engine mounting device 200 low vibration transmission efficiency. As compared with the engine mounting device 200, since the prior art engine mounting device contains a gas in one of the two fluid chambers having a spring constant smaller than another, it shows less noise reduction effect.

The following description will be directed to a manner of establishing standard values suitable for the engine mounting device 200 to exhibit desired performance.

Figures 18, 19:
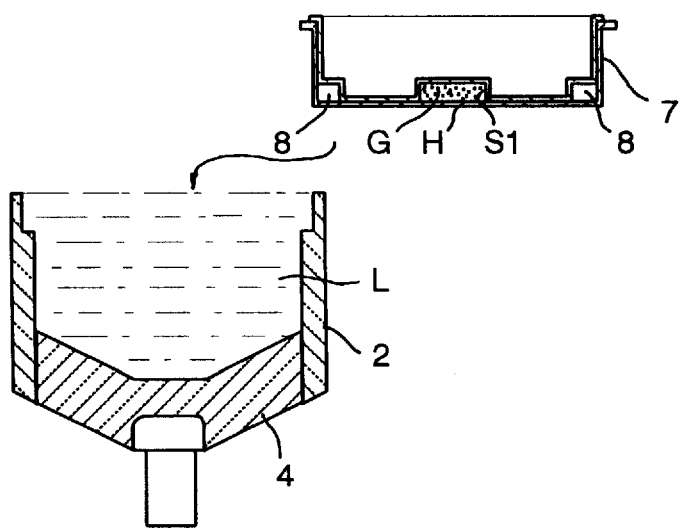
FIG. 18 is a table showing points indicating grade designations by which noise reduction performance of the engine mounting device are specified.
FIG. 19 is an explanatory view of an engine mounting device for explaining a manner of confining a gas in the fluid container.

Referring to FIG. 14 which shows a result of evaluation with regard to noise reduction according to confined gas quantity, the engine mounting device 200 containing a gas of 0.5 cc scores five (5) points. In FIG. 18 showing a table of points indicating grade designations by which the noise reduction performance of engine mounting device is specified, five points is the lowest allowable grade of performance. The engine mounting device 200 containing a gas of 7 cc scores eight (8) points which indicates a pretty good grade of performance. For confined gas quantities more than 7 cc, the engine mounting device 200 does not score greater-than-eight (8) points. This fact proves that a confined gas more than 0.5 cc is effective to noise reduction.

Referring to FIG. 15 which shows a result of evaluation with regard to engine vibration attenuation according to confined gas quantity, the engine mounting device 200 scores five (5) points when containing a gas of 7 cc and five and a half (4.5) points when containing a gas of 8 cc. The engine mounting device 200 scores more-than-five (5) points assigned to the lowest allowable grade of performance when containing a gas less than 7 cc and seven (7) points assigned to a pretty good grade of performance when containing a gas less than 3 cc. When the engine mounting device 200 containing a gas less than 3 cc scores more-than-seven (7) points, providing higher vibration attenuation efficiency. This fact proves that a confined gas less than 3 cc, which provides for the engine mounting device 200 a vibration attenuation efficiency (Tan δ) of 0.6 (see FIG. 11), is effective to vibration attenuation.

Figures 16, 17:
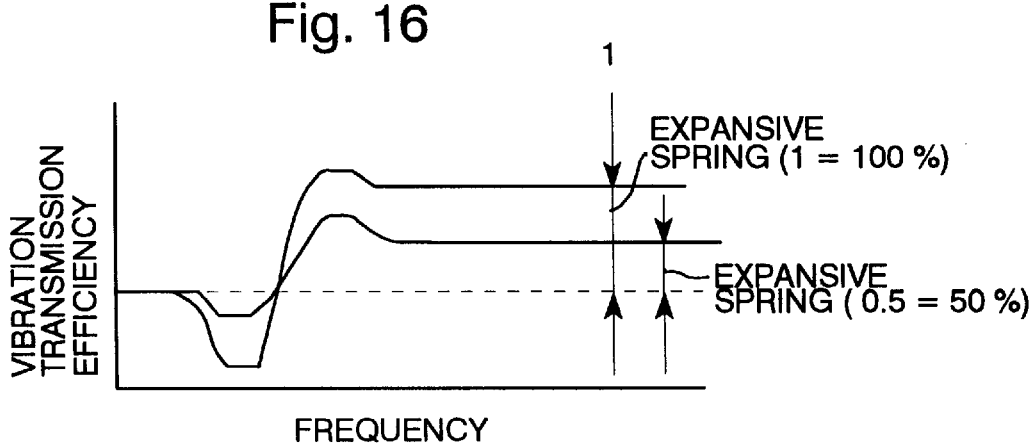
FIG. 16 is a diagram showing a change in vibration transmission efficiency according to expansive stiffness.
FIG. 17 a table showing a result of noise reduction evaluation according to a change in vibration transmission efficiency due to expansive stiffness.

Referring to FIG. 16 which shows a change in vibration transmission efficiency according to the expansive stiffness of the first fluid chamber 10a as an expansive spring, when the engine mounting device 200 provides a drop of 50% in vibration transmission efficiency, it scores higher-than-six (6) points. As clearly understood from FIGS. 16 and 18, if the engine mounting device 200 contains a gas so as to provide a drop in vibration transmission efficiency more than 50%, it scores points higher than six (6). As shown in FIG. 17, a 50% drop and a 60% drop in vibration transmission efficiency assign six (6) points; and a 75% drop and a 95% drop in vibration transmission efficiency assign seven (7) points. Evaluating the noise reduction performance of the engine mounting device 200 in an aspect of a drop in vibration transmission efficiency, the quantity of a confined gas regulated so that the engine mounting device 200 provides a more-than-50% drop in vibration transmission efficiency is effective to noise reduction.

As apparent from the above evaluation analysis concerning the performance of the engine mounting device 200, the engine mounting device 200 provides high vibration transmission efficiency when it contains a gas less than 0.5 cc and a small drop in vibration transmission efficiency when it contains a gas more than 7 cc. Accordingly, it is preferred with respect to noise reduction performance for the engine mounting device 200 to contain a gas of a quantity between 0.5 cc and 7 cc. With respect to vibration reduction performance, the engine mounting device 200 is preferred to have a vibration attenuation efficiency (Tan δ) of 0.6 which is realized when the engine mounting device 200 contains a gas less than 3 cc. From these facts, it is concluded that the most desirable confined gas quantity of the engine mounting device 200 is between 0.5 and 3 cc.

The engine mounting device 200 described above is manufactured by a unique method. Summarizing the method of manufacturing the engine mounting device 200, after having filled the fluid container of the engine mounting device 200 with a fluid L, air is removed out and a predetermined gas, such as air G, is confined in the fluid container. Thereafter, the engine mounting device 200 is compressed with an external force equivalent to the weight of an engine and sealed air-tightly. When the external force is removed after sealing, the engine mounting device 200 keeps its fluid chambers 10a and 10b at a negative pressure. The engine mounting device 200 thus completed provides an internal pressure balanced with the atmospheric pressure when mounting the engine thereon, acting as an air spring.

There are various manners to confine a predetermined quantity of air in the fluid container. As shown in FIG. 19, there is prepared a partition wall 7 formed with an air pocket S1 having an air hall H. The air pocket S1 has a cubic content equal to a predetermined quantity of air G. The partition wall 7 is placed upside down and is fitted and secured into the fluid container 2 placed upside down and filled with a fluid L. After having secured the partition wall 7 into the fluid container 2 in position, the elastic bottom diaphragm 9 is secured to and closes up the fluid container 2 air-tightly. When the engine mounting device 200 completely assembled is erected, the air G in the air pocket S1 flows out through the hall H into the first fluid chamber 10a. In this manner, a predetermined quantity of air G is confined in the first fluid chamber 10a of the engine mounting device 200.

Figure 20:
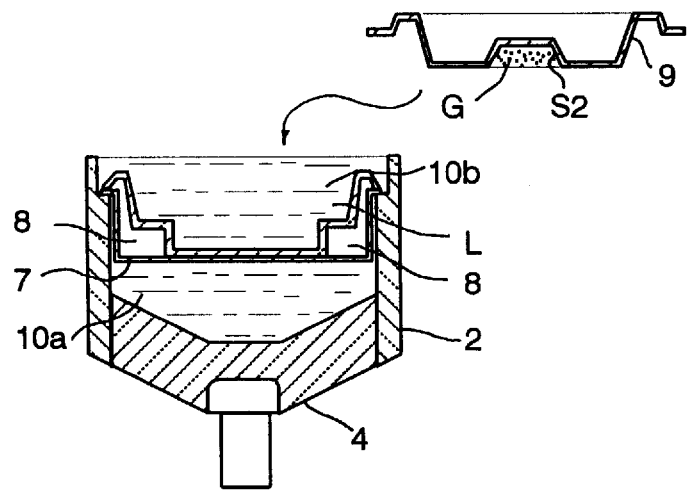
FIG. 20 is an explanatory view of an engine mounting device for explaining another manner of confining a gas in the fluid container.

FIG. 20 shows another manner of confining a predetermined quantity of air into the fluid container 2. There is prepared a bottom diaphragm 9 formed with an open air pocket S2. The air pocket S2 has a cubic content equal to a predetermined quantity of air G so as to accumulate the predetermined quantity of air G therein when it is put upside down. After having secured a partition wall 7 into the fluid container 2 in position, the bottom diaphragm 9 is placed upside down and is fitted to the fluid container 2 placed upside down and filled with a fluid L keeping the air G accumulated in the air pocket S2. Subsequently, the bottom diaphragm 9 is secured to and closes up the fluid container 2 air-tightly. When the engine mounting device 200 completely assembled is erected, the air G in the air pocket S2 is forced to flow upward through an orifice 8 of the partition wall 7 into the first fluid chamber 10a, so as to be confined in the first fluid chamber 10a of the engine mounting device 200.

Figure 21:
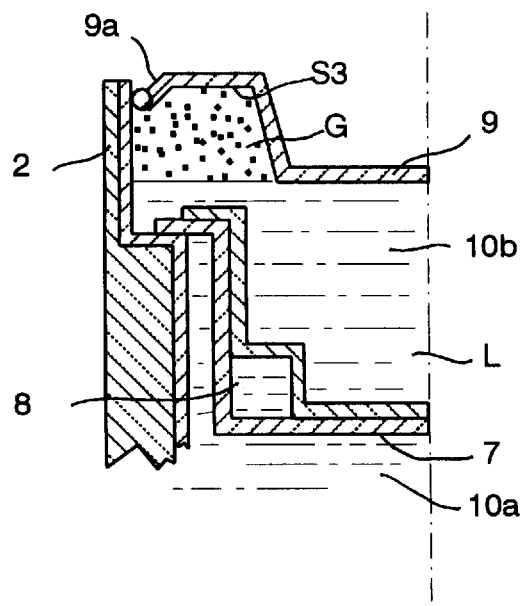
FIG. 21 is an explanatory view of an engine mounting device for explaining still another manner of confining a gas in the fluid container.

FIG. 21 shows another manner of confining a predetermined quantity of air into the fluid container 2 by use of a bottom diaphragm 9. The bottom diaphragm 9 is prepared so as to have a peripheral bent portion 9a. After having secured a partition wall 7 into the fluid container 2 in position, the bottom diaphragm 9 is placed upside down and is fitted to the fluid container 2 placed upside down and filled with a fluid L. When the periphery of the bottom diaphragm 9 is secured to and closes up the fluid container 2 air-tightly, an open air pocket S3 is formed by the peripheral bent portion 9a, the wall of the fluid container 2 and the fluid L and confines air G therein. In this instance, the peripheral bent portion 9a is configured so as to form the air pocket S3 having a cubic content equal to a predetermined quantity of air. When the engine mounting device 200 completely assembled is erected, the air G in the air pocket S3 is forced upward into the first fluid chamber 10a, so as to be confined in the first fluid chamber 10a of the engine mounting device 200.

Figure 22:
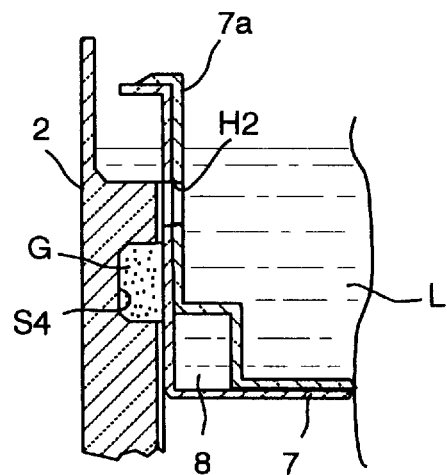
FIG. 22 is an explanatory view of an engine mounting device for explaining another manner of confining a gas in the fluid container.

Referring to FIG. 22 showing still another manner of confining a predetermined quantity of air into the fluid container 2, there are prepared a fluid container 2 formed with an open air pocket S4 in its wall and a partition wall 7 formed with an opening H2 in its vertical wall 7a. The air pocket S4 has a cubic content equal to a predetermined quantity of air G to be confined. After having fitted the partition wall approximately halfway into the fluid container so as to close the air pocket S4 by the vertical wall 7a, the fluid container 2 placed upside down is filled with a fluid L. Subsequently, a bottom diaphragm 9 is secured to and closes up the fluid container 2 air-tightly simultaneously with further inserting the partition wall 7 into the fluid container 2 until the opening H2 is brought into alignment with the air pocket S4 so as to complete the engine mounting device 200. This allows the air G in the air pocket S4 to flow into the fluid L. When the engine mounting device 200 thus assembled is erected, the air G is forced upward through an orifice 8 of the partition wall 7 into the first fluid chamber 10a, so as to be confined in the first fluid chamber 10a of the engine mounting device 200.

Figure 23:
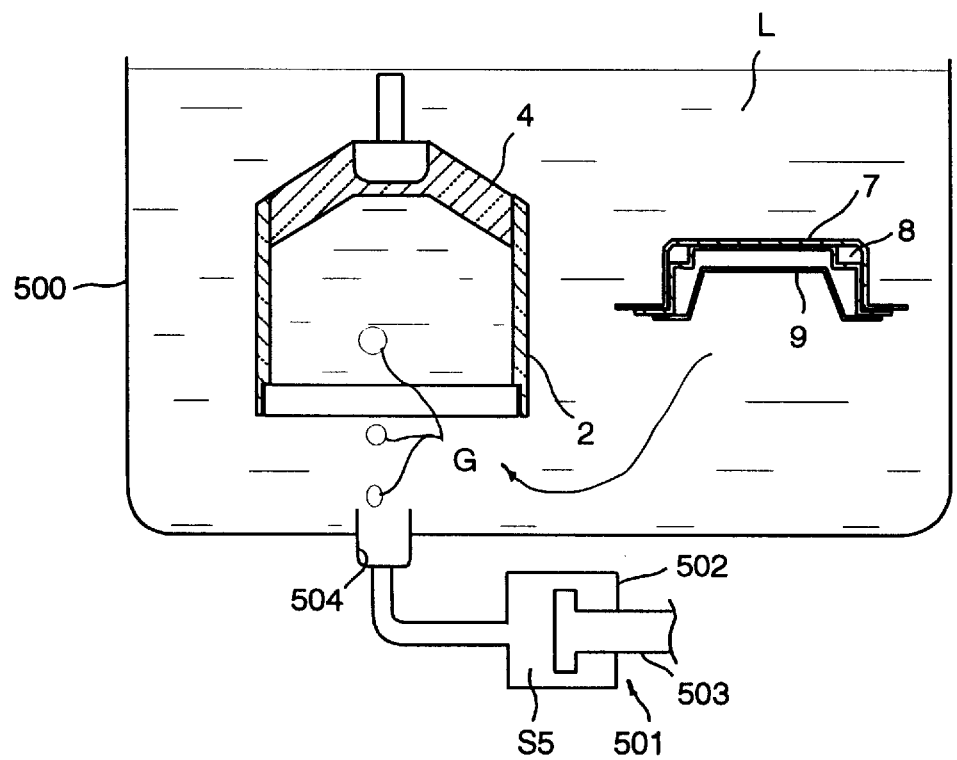
FIG. 23 is an explanatory view of an engine mounting device for explaining another manner of confining a gas in the fluid container.

FIG. 23 shows a manner of confining a predetermined quantity of air into the fluid container 2 which is carried out underwater. A tank 500 filled with a fluid L is provided with an air injection device 501 comprising a cylinder 502 and a piston 503. The air injection device 501 has a rated displacement S5 equal to a predetermined quantity of a gas to be confined in the fluid container 2 of the engine mounting device 200. Every time the air injection device 501 is operated, a predetermined quantity of air G is supplied into a fluid L in the tank 500 through an outlet 504. A fluid container 2 closed at one end by an elastic rubber pad 4 as a top wall is put into the fluid in the tank 500 and placed above the outlet 504. After having operated the air injection device 501 once so as to deliver a predetermined quantity of air G within the fluid container 2, a partition wall 7 and a bottom diaphragm 9 are fitted to and close up the fluid container 2. In this instance, the air injection device 501 may inject an inert gas contained in a gas bottle connected thereto.

Figure 24:
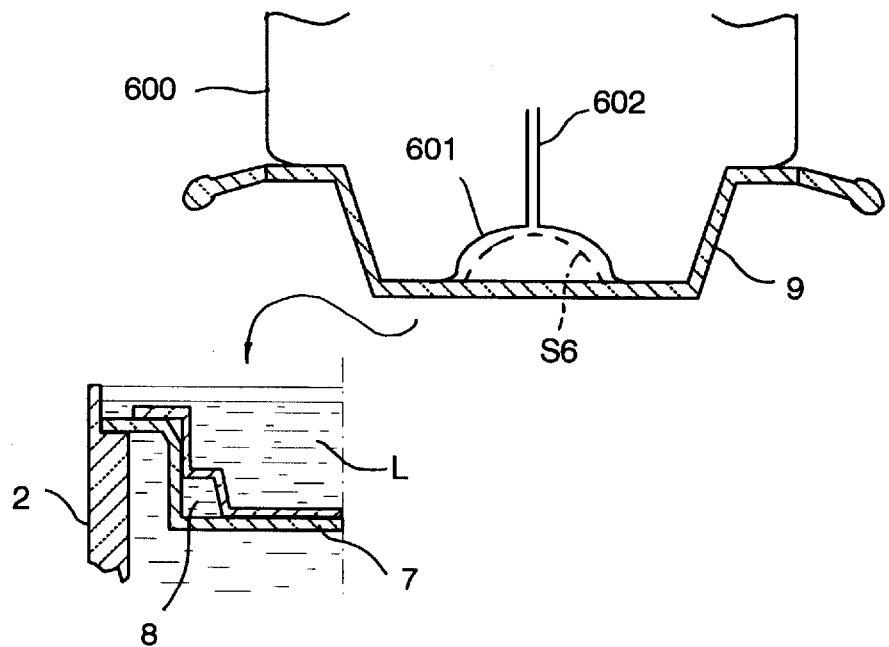
FIG. 24 is an explanatory view of an engine mounting device for explaining another manner of confining a gas in the fluid container.

FIG. 24 shows a manner of confining a predetermined quantity of air into the fluid container 2 in which a suction head is used to form an open air pocket S6 in a bottom diaphragm 9. The suction head 600 is formed with a semi-circular dent 501 which is in communication with a suction pump (not shown) through an air path 502. After putting the suction head 500 on a bottom diaphragm 9, the suction pump is operated to suck a part of the bottom diaphragm 9 so as to form an air pocket S6. The dent 501 is configured so that the air pocket S6 accumulates a predetermined quantity of air G therein when it is put upside down. After having secured a partition wall 7 into the fluid container 2 in position, the bottom diaphragm 9 sucked by the suction head 500 is fitted to the fluid container 2 placed upside down and filled with a fluid L. Subsequently, the bottom diaphragm 9 is secured to and closes up the fluid container 2 air-tightly. When the suction head is removed from the bottom diaphragm 9, the bottom diaphragm 9 restores to its original shape, forcing the air G in the air pocket S6 into the fluid L. When the engine mounting device 200 completely assembled is erected, the air G is forced to flow upward through an orifice 8 of the partition wall 7 into the first fluid chamber 10a, so as to be confined in the first fluid chamber 10a of the engine mounting device 200.

Figure 25:
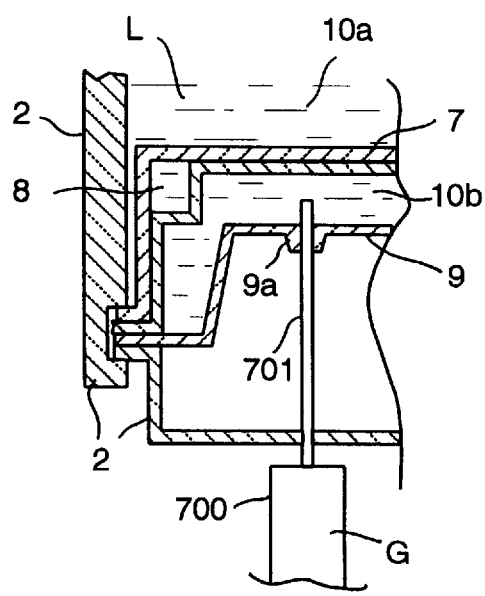
FIG. 25 is an explanatory view of an engine mounting device for explaining a further manner of confining a gas in the fluid container.

Referring to FIG. 25 showing another manner of confining a predetermined quantity of air into the fluid container 2 in which a gas injector or syringe is used, after having assembled the engine mounting device 200 filled with a fluid L, a needle 601 of a gas injector 600 is pricked into a first fluid chamber 10a through a thick portion 9a of a bottom diaphragm 9 and a predetermined quantity of air is injected into the first fluid chamber 10a. Because the bottom diaphragm 9 is made of an elastic material, the air G and fluid L do not escape when and after the injector needle 601 is pulled out.

Figure 26:
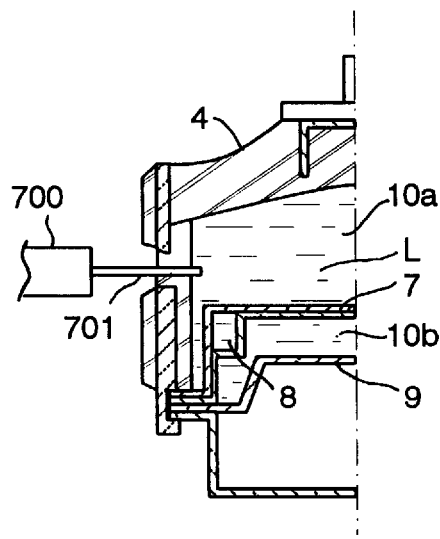
FIG. 26 is an explanatory view of an engine mounting device for explaining a still further manner of confining a gas in the fluid container.
Figure 27:
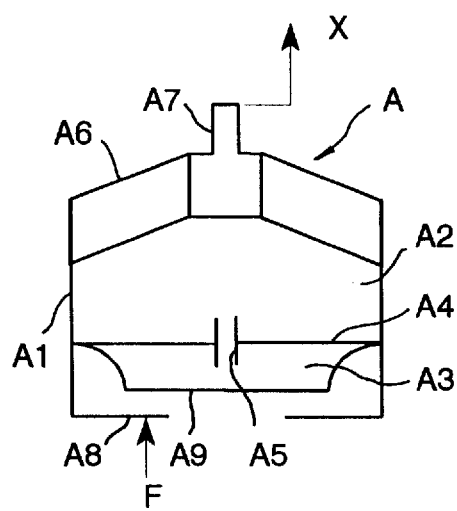
FIG. 27 is a schematic illustration showing a prior art engine mounting device of the first generation.
Figure 28:
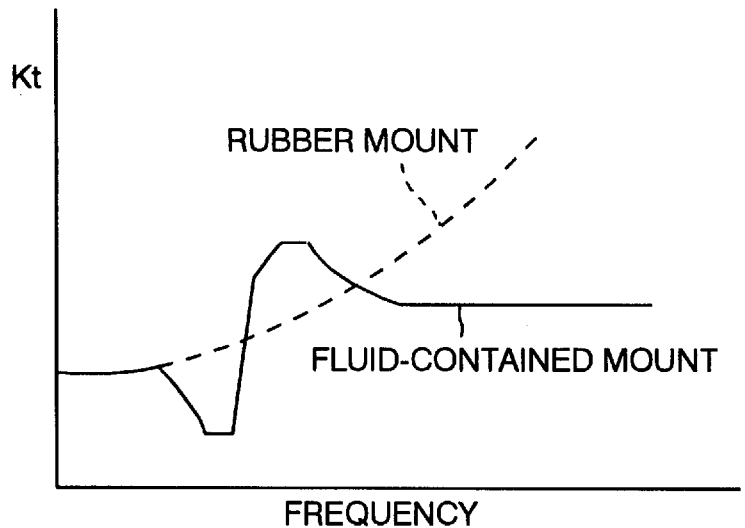
FIG. 28 is a graph showing the vibration transmission characteristic of the prior art engine mounting device of FIG. 27.
Figure 29:
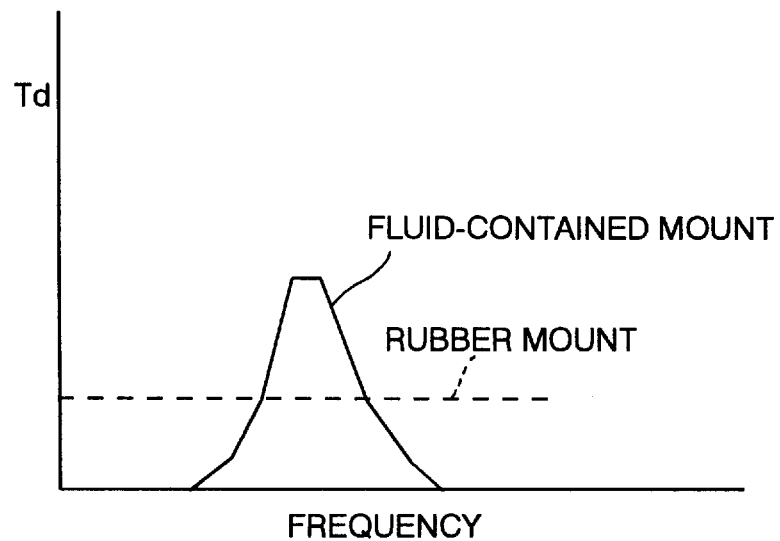
FIG. 29 is a graph showing the vibration attenuation characteristic of the prior art engine mounting device of FIG. 27.
Figure 30:
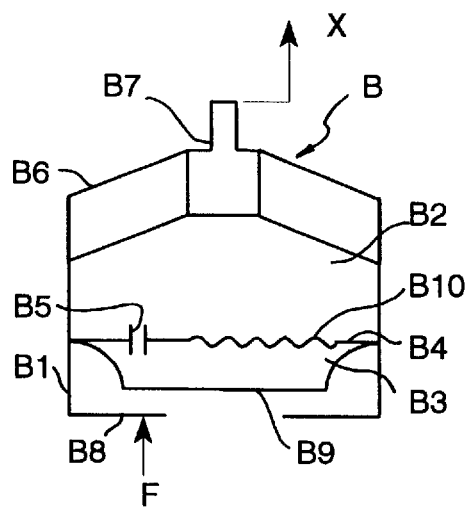
FIG. 30 is a schematic illustration showing a prior art engine mounting device of the second generation.
Figure 31:
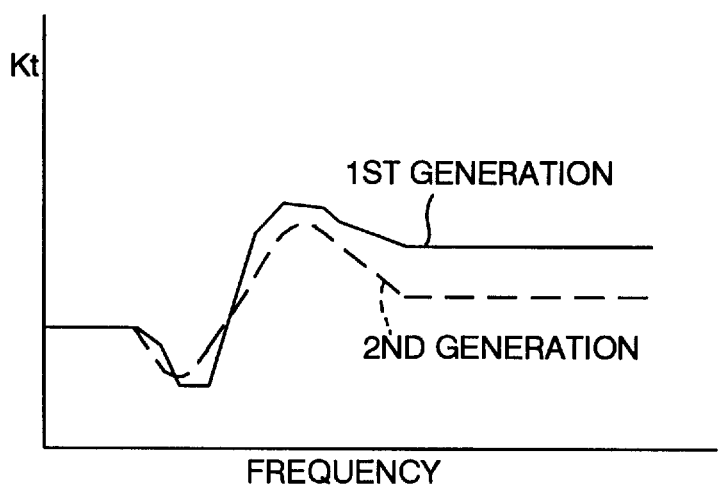
FIG. 31 is a graph showing the vibration transmission characteristic of the prior art engine mounting device of FIG. 30.
Figure 32:
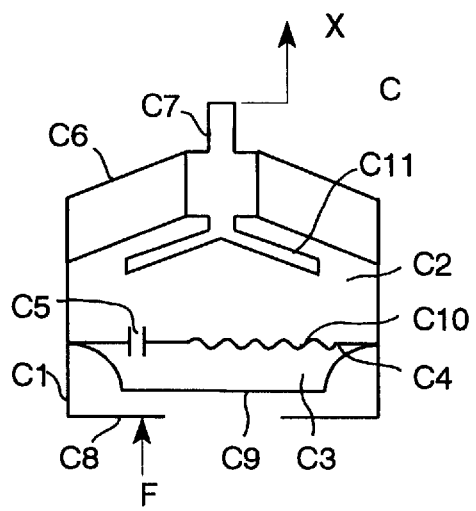
FIG. 32 is a schematic illustration showing a prior art engine mounting device of the third generation.
Figure 33:
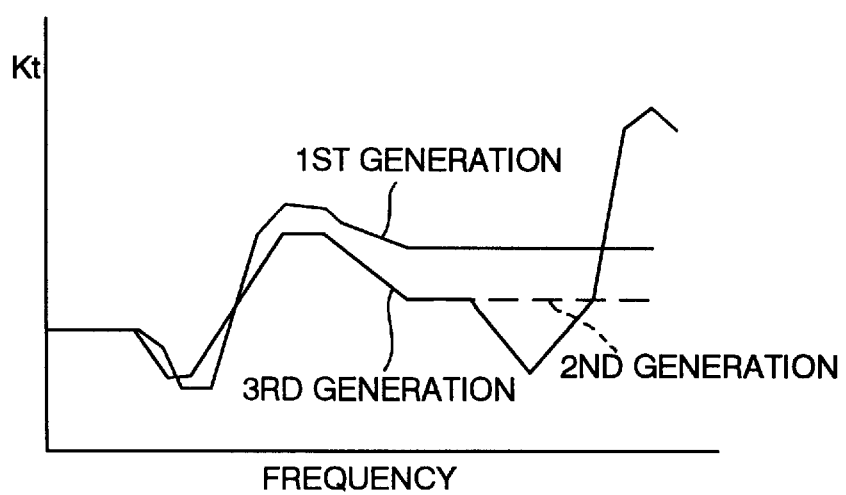
FIG. 33 is a graph showing the vibration transmission characteristic of the prior art engine mounting device of FIG. 32.

FIG. 26 shows still another manner of confining a predetermined quantity of air into the fluid container 2 in which air is injected through a rigid fluid container. After having assembled the engine mounting device 200 filled with a fluid L, a needle 601 of a gas injector 600 is pricked into a first fluid chamber 10a through an opening 2a formed in the wall of a rigid fluid container 2 and a predetermined quantity of air is injected into the first fluid chamber 10a. After the injection of air, a filler is press-fitted into the opening 2a of the fluid container 2 to stop up the opening 2a.

Alternatively, an irreversibly gasifying solid material, such as naphthalene and sodium carbonate, may be used to confine a predetermined quantity of a gas in the fluid container. When the fluid container 2 filled with a fluid L is closed up air-tightly, a predetermined quantity of an irreversibly gasifying material is mixed in the fluid L. The solid material gasifies and is irreversible to solid or liquid at a room temperature or a temperature higher than the room temperature. Further, a gas-contained capsule may be used to confine a predetermined quantity of a gas in the fluid container. When the fluid container 2 filled with a fluid L is closed up air-tightly, a capsule containing a predetermined quantity of a gas is put in the fluid L. The capsule is made of a material which is easily soluble in the fluid such as lactose.

In order to make up a deficit in gas quantity in the fluid container or adjust the vibration attenuation efficiency of the engine mounting device 200, the gas injectors such as shown in FIGS. 25 and 26 may be used. The gas G to be confined in the fluid container may not only be a inert gases but also be any gas hardly soluble in the fluid. It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An automobile engine mounting device, containing a fluid in a fluid container closed up air-tightly by walls including at least a rigid cylindrical wall, an elastic top wall and an elastic bottom wall consisting of an elastic diaphragm, for mounting an engine on a vehicle body and absorbing vibrations of the engine transmitted thereto by means of expansion and contraction of the elastic top and bottom walls and the fluid, said engine mounting device comprising:

engine connecting means for connecting said engine mounting device to said engine;

body connecting means for connecting said engine mounting device to said vehicle body;

a partition wall for dividing said fluid container into a first fluid chamber closed by said elastic top wall and a second fluid chamber closed by said elastic bottom wall, said partition wall being formed with an orifice which allows said fluid to move between said first fluid chamber and said second fluid chamber due to expansion and contraction of said elastic top and bottom walls; and gas pocket means formed in at least one of said walls for holding a predetermined quantity of a gas before assembling said walls to said fluid container placed upside down and filled with said fluid and releasing said gas into said fluid after assembling said fluid container and releasing said gas into said fluid, whereby confining said predetermined quantity of said gas in said first fluid chamber.

2. An engine mounting device as defined in claim 1, wherein said engine connecting means is secured to either one of said elastic top wall and said rigid cylindrical wall and said body connecting means is secured to another.

3. An engine mounting device as defined in claim 1, wherein said gas is an inert gas.

4. An engine mounting device as defined in claim 1, wherein said gas is air.

5. An engine mounting device as defined in claim 4, wherein said gas pocket means is formed as a dent in said partition wall so as to accumulate air therein before said partition wall is installed into said fluid container placed up side down and filled with said fluid and release said air directly into said fluid when erecting said fluid container.

6. An engine mounting device as defined in claim 4, wherein said gas pocket means is formed as an air chamber having an orifice in said partition wall so as to contain air therein before said partition wall is installed into said fluid container placed upside down and filled with said fluid and release said air into said fluid and release said air into said fluid through said orifice when erecting said fluid container.

7. An engine mounting device as defined in claim 4, wherein said gas pocket means is formed as an open air chamber between a periphery of said elastic bottom wall and said rigid cylindrical wall so as to contain air therein when said elastic diaphragm is installed into said fluid container placed upside down and filled with said fluid and release said air directly into said fluid when erecting said fluid container.

8. An engine mounting device as defined in claim 4, wherein said gas pocket means is formed as an open air chamber in said rigid cylindrical wall as to contain air therein when said partition wall is installed halfway into said fluid container placed upside down and empty of a fluid and release said air into said fluid when said partition wall is installed into a full position after filling said fluid container with said fluid.

9. An engine mounting device as defined in claim 1, wherein said first fluid chamber confines therein a quantity of said gas so that said first fluid chamber functioning as an expansive spring reduces a spring constant thereof to more-than-50% as compared with said engine mounting device empty of fluid.

10. An engine mounting device as defined in claim 1, wherein said first fluid chamber confines therein a quantity of said gas so that said first fluid chamber functioning as an expansive spring reduces a spring constant thereof to less-than-75% as compared with said engine mounting device empty of said fluid.

11. An engine mounting device as defined in claim 1, wherein said first fluid chamber confines therein said gas between 0.5 and 7 cc.

12. An engine mounting device as defined in claim 1, wherein said first fluid chamber confines therein said gas between 0.5 and 4 cc.

13. An engine mounting device as defined in claim 1, wherein said first fluid chamber confines therein said gas of 3 cc.

14. An automobile engine mounting device for mounting an engine on a vehicle body and absorbing vibrations of the engine transmitted to the engine, said engine mounting device comprising:

an engine connecting member for connecting said engine mounting device to said engine;

a body connecting member for connecting said engine mounting device to said vehicle body;

a fluid container for containing a fluid therein, said fluid container being closed up air-tightly by walls including at least a rigid cylindrical wall, an elastic top wall and an elastic bottom wall consisting of an elastic diaphragm;

a partition wall for dividing said fluid container into a first fluid chamber closed by said elastic top wall and a second fluid chamber closed up by said elastic bottom wall, said partition wall being formed with an orifice which allows said fluid to move between said first fluid chamber and said second fluid chamber due to expansion and contraction of said elastic top wall and said elastic bottom wall; and a gas pocket formed in at least one of said walls for holding a predetermined quantity of a gas before assembling said walls to said fluid container placed upside down and filled with said fluid and releasing said gas into said fluid after assembling said fluid container, whereby confining said predetermined quantity of gas in said fluid in said first fluid chamber.

* * * * *